（12）United States Patent
Langlot et al.

(10) Patent No.: US 8,167,530 B2
(45) Date of Patent: May 1, 2012

(54) ROBOTIC PALLET-EMPTYING AND MAGAZINE-LOADING APPARATUS

(75) Inventors: Gordon Scott Langlot, Spokane, WA (US); Douglas Alan Boozer, Greenacres, WA (US); Derick Baker, Liberty Lake, WA (US); Allen Jerome Chase, Spokane, WA (US); Philip Scott Germond, Roseville, CA (US); Troy Scott, Spokane, WA (US)

(73) Assignee: Pearson Packaging Systems, Spokane, WA (US)

( * ) Notice: Subject to any disclaimer, the term of this patent is extended or adjusted under 35 U.S.C. 154(b) by 949 days.

(21) Appl. No.: 12/180,191

(22) Filed: Jul. 25, 2008

(65) Prior Publication Data

US 2009/0028676 A1 Jan. 29, 2009

Related U.S. Application Data

(60) Provisional application No. 60/951,895, filed on Jul. 25, 2007.

(51) Int. Cl.
*B65G 65/23* (2006.01)
(52) U.S. Cl. ........................................ 414/801; 414/419

(58) Field of Classification Search .................. 414/419, 414/790.2, 798.5, 801, 811; 53/446
See application file for complete search history.

(56) References Cited

U.S. PATENT DOCUMENTS

| | | | | |
|---|---|---|---|---|
| 6,026,967 A * | 2/2000 | Isaacs et al. | .................. | 209/539 |
| 6,213,707 B1 * | 4/2001 | Liehs et al. | .................. | 414/421 |
| 6,695,570 B2 * | 2/2004 | Ford et al. | .................. | 414/798.6 |
| 6,719,519 B2 * | 4/2004 | Liehs | ............................ | 414/419 |
| 7,648,322 B2 * | 1/2010 | Moncrief et al. | ............. | 414/419 |

* cited by examiner

*Primary Examiner* — Charles A Fox
(74) *Attorney, Agent, or Firm* — Lee & Hayes, PLLC

(57) ABSTRACT

Examples of a robotic de-palletizer and a robotic magazine loader are described herein. The robotic de-palletizer is configured to remove cases (e.g. HSC (half slotted cases) filled with product (e.g. disassembled cartons)) and to place the HSC on one or more conveyors. The conveyor(s) move the full HSC from the "de-palletizing" area to a magazine-loading area for processing by a robotic magazine loader. In one example of the robotic magazine loader, HSC containing unassembled cartons are removed from the conveyor. The contents of the HSC are added to a magazine feeding a carton assembling and filling machinery and the empty HSC is conveyed to a discard location.

20 Claims, 23 Drawing Sheets

ROBOTIC PALLET-EMPTYING AND MAGAZINE-LOADING APPARATUS

RELATED APPLICATIONS

This patent application claims priority to U.S. provisional patent application Ser. No. 60/951,895, having title "Robotic Pallet-Emptying and Magazine-Loading Apparatus", filed on 25 Jul. 2007, commonly assigned herewith, and hereby incorporated by reference.

BACKGROUND

The cartons used to package consumer, commercial and industrial goods are frequently themselves packaged prior to being assembled and filled with a designated merchandise. For example, the cartons used for retail of 12-packs of 12 oz. soft drink cans are made of fiberboard and are transported in a disassembled or "knocked down" configuration within a case or box. Such cartons can be referred to as "product," and ultimately will contain "merchandise" (e.g. soft drink cans). A large number of such cartons may be packaged in a box, known as an "HSC" or half-slotted case. Such cases can be made of cardboard and have no top or lid. The HSC may be transported on pallets. Accordingly, a task involves removing the HSC from the pallet, and removing the cartons from each HSC for precision placement onto a magazine feeding machinery that assembles and fills each carton. This is frequently done manually.

A "magazine" is device that contains cartons (product), such as the cartons used to contain 12 cans of soft drink, and allows the cartons to be fed into machinery that assembles the cartons and fills them with merchandise (e.g. cans of soft drink).

Loading a magazine is a difficult and repetitious job. Failure to unload the HSC rapidly enough from a pallet, and to thereby maintain an adequate supply of product in the magazine, can cause assembly line shutdown. Numerous other failures can result in down time. For example, failure to align (register) the cartons within the magazine can result in jamming of the machinery consuming the cartons.

SUMMARY

Examples of a robotic de-palletizer (pallet emptying device) and a robotic magazine-loader are described herein. The robotic de-palletizer is configured to remove cases (e.g. HSC filled with product (e.g. partially disassembled cartons)) and to place the HSC on one or more conveyors. The conveyor moves the full HSC from the "de-palletizing" area to a magazine-loading area for processing by a robotic magazine-loader. In one example of the robotic magazine-loader, HSC (half-slotted cases) containing unassembled cartons are removed from the conveyor. The contents of the HSC are added to a magazine feeding a carton assembling and filling machinery and the empty HSC is conveyed to a discard location.

This Summary is provided to introduce a selection of concepts in a simplified form that are further described below in the Detailed Description. This Summary is not intended to identify key features or essential features of the claimed subject matter, nor is it intended for use as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Examples of a robotic de-palletizer and a robotic magazine loader are described herein. The robotic de-palletizer is configured to remove cases (e.g. HSC filled with product (e.g. disassembled cartons)) and to place the full HSC on one or more conveyors. Thus, the "de-palletizer" removes cases from a pallet, thereby "de-palletizing" them. The conveyor(s) move the full HSC from the "de-palletizing" area to a magazine-loading area for processing by a robotic magazine loader. In one example of the robotic magazine loader, HSC (half-slotted cases) containing unassembled cartons are removed from the conveyor. The contents of the HSC are added to a magazine feeding a carton assembling and filling machinery and the empty HSC is conveyed to a discard location.

Example Robotic De-Palletizer

Figure 1:
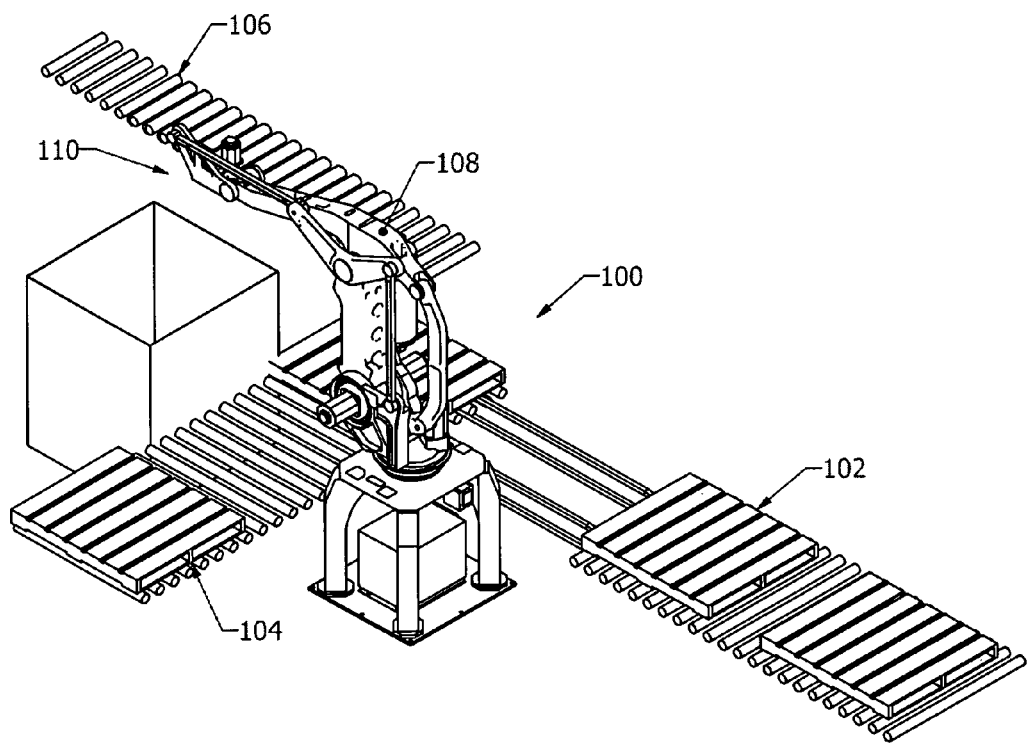
FIG. 1 illustrates an example of a robotic de-palletizer having a pallet input on the right, pallet output on the left, and a conveyor in the upper left that transports the full HSC to the robotic magazine-loader.

FIG. 1 illustrates an example of a robotic de-palletizer 100 having a pallet input 102 on the right, pallet output 104 on the left, and a conveyor 106 in the upper left that transports the full HSC to the robotic magazine loader. While not shown in the drawing for reasons of clarity, the pallet in-feed 102 includes pallets with HSC filled with product (cartons). A tool or device is configured to move the HSC from the pallet 102 to the conveyor 106. This tool or device can be configured and/or selected to fit the needs of any particular application. For example, a gantry-supported tool or device may be used. Alternatively, FIG. 1 illustrates use of a robot arm and an EOAT (end of arm tool) to move the HSC from the pallet 102 to the conveyor 106. Once emptied of HSC, the pallet 102 is moved to the pallet output 104. While FIG. 1 shows the robot arm 108, the EOAT 110 is not actually illustrated for reasons of clarity. Accordingly, in FIG. 1 designator 110 shows the location for attachment of the EOAT. However, the EOAT 110 is seen attached to a robot arm 108 in FIG. 7 and in an enlarged view in FIG. 8.

Figure 2:
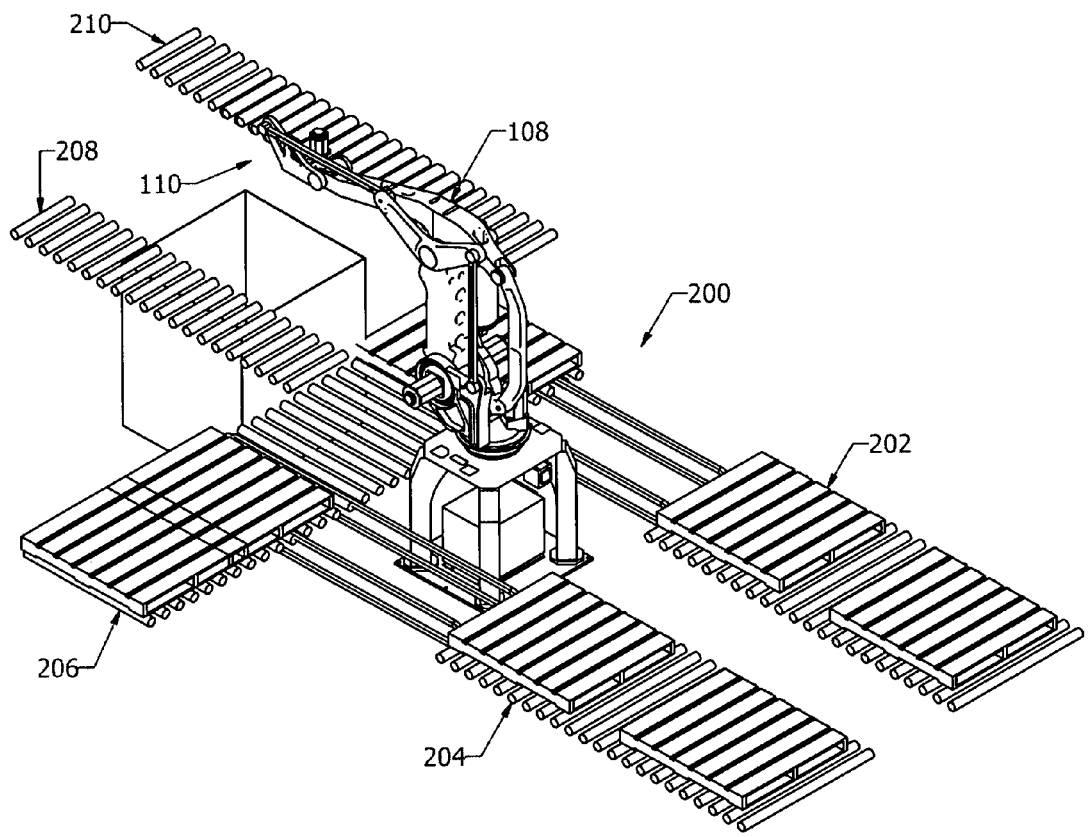
FIG. 2 illustrates an example of a robotic de-palletizer having two input pallet conveyors, one output pallet conveyor and two output conveyors for full HSC.

FIG. 2 illustrates an example of a robotic de-palletizer 200 having two input pallet conveyors 202, 204 and one output pallet conveyor 206 and two output conveyors for full HSC 208, 210. Thus, the robot arm 108 and EOAT 110 (end of arm tool) is configured to remove HSC full of product from both of the input pallets 202, 204 and put them on the output conveyors 208, 210 for transport to the robotic magazine loader. (The reader is again referred to FIGS. 7 and 8 for a view of the EOAT 110.) Once emptied, the pallets 202, 204 are put onto the pallet exit 206. Note that the product contained in each of the input pallets 202, 204 can be different (e.g. different brand name or flavor, such as "regular" or "diet"). Thus, each pallet line 202, 204 supplies a different conveyor 208, 210 leading to an associated (e.g. each conveyor associated with a magazine loader) magazine loader.

Figure 3:
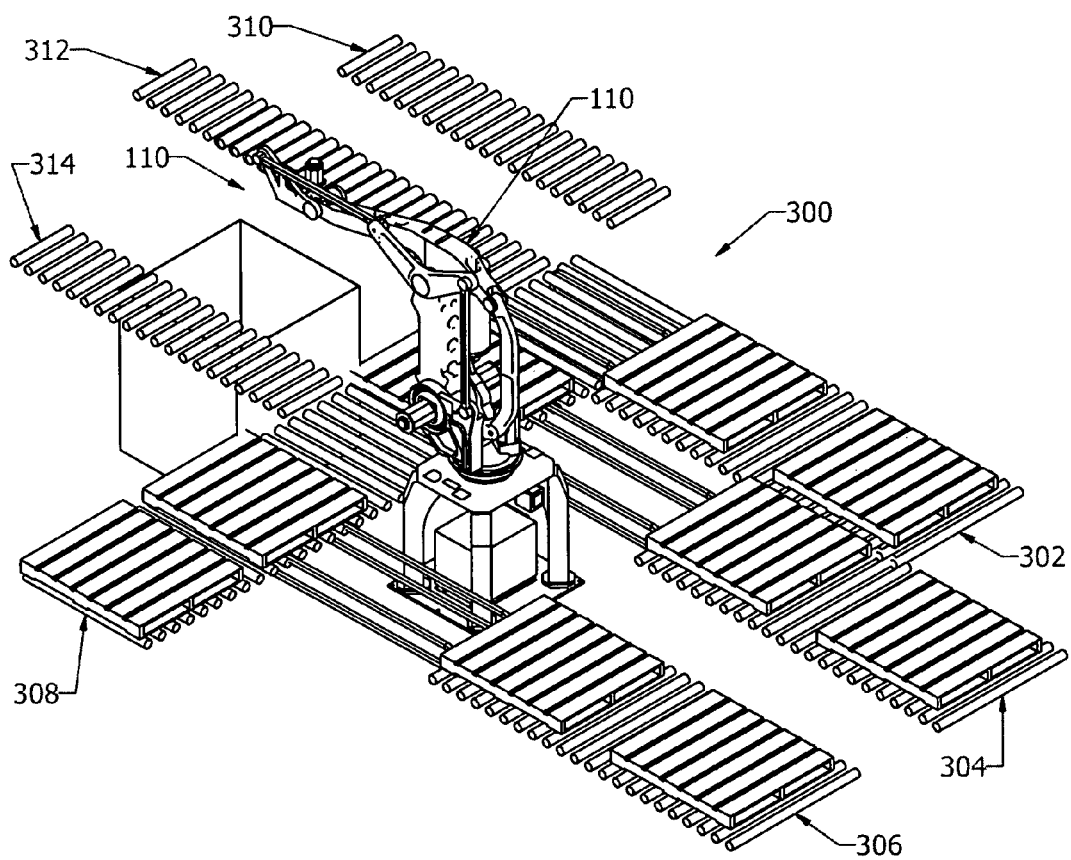
FIG. 3 illustrates an example of a robotic de-palletizer having three input pallet conveyors, one output pallet conveyor and three output conveyors for full HSC.

FIG. 3 illustrates an example of a robotic de-palletizer 300 having three input pallet conveyors 302, 304, 306 and one output pallet conveyor 308 and three output conveyors 310, 312, 314 for full HSC. Thus, the robot arm 108 and EOAT 110 (end of arm tool) is configured to remove HSC full of product from all three of the input pallets 302, 304, 306 and put them on the output conveyors 310, 312, 314 for transport to the robotic magazine loader. (The reader is again referred to FIGS. 7 and 8 for a view of the EOAT 110.) Once emptied, the pallets 302, 304, 306 are put onto the pallet exit 308. Note that the product contained in each of the input pallets 302, 304, 306 can be different (e.g. different brand name or flavor, such as "regular" or "diet"). Thus, each pallet line 302, 304, 306 supplies a different conveyor 310, 312, 314 leading to an associated magazine loader.

Figure 4:
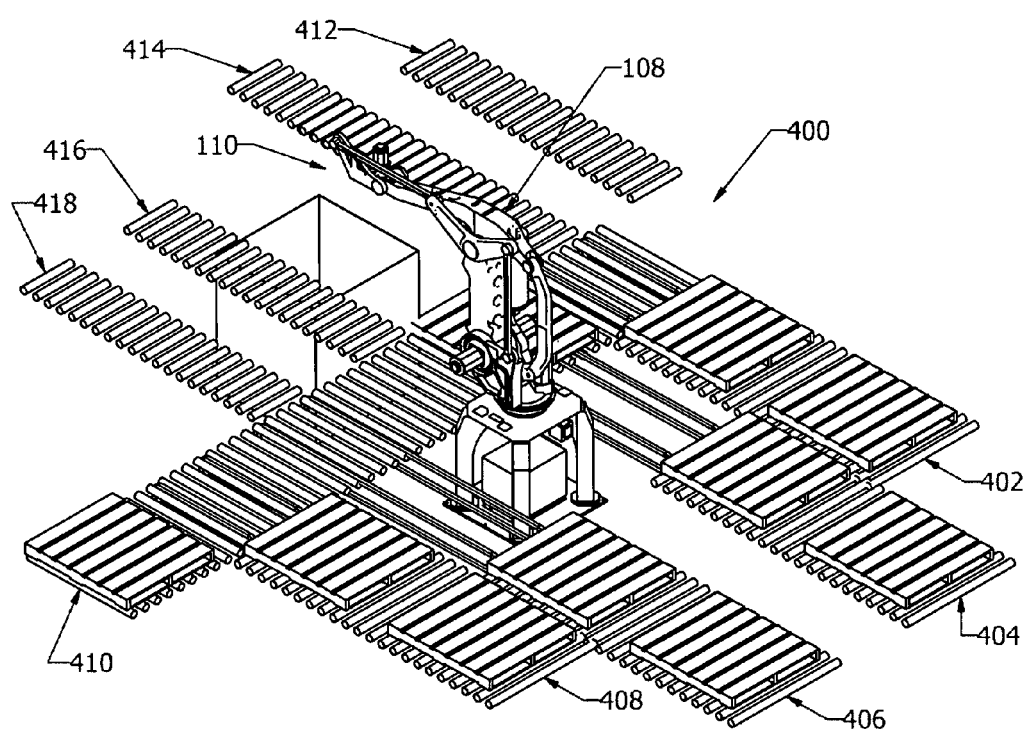
FIG. 4 illustrates an example of a robotic de-palletizer having four input pallet conveyors, one output pallet conveyor and four output conveyors for full HSC.

FIG. 4 illustrates an example of a robotic de-palletizer 400 having four input pallet conveyors 402, 404, 406, 408, one output pallet conveyor 410 and four output conveyors 412, 414, 416, 418 for full HSC. Thus, the robot arm 108 and EOAT 110 (end of arm tool) is configured to remove HSC full of product from all four of the input pallets 402, 404, 406, 408 and put them on the output conveyors 412, 414, 416, 418 for transport to the robotic magazine loader. (The reader is again referred to FIGS. 7 and 8 for a view of the EOAT 110.) Once emptied, the pallets 402, 404, 406, 408 are put onto the pallet exit 410. Note that the product contained in each of the input pallets 402, 404, 406, 408 can be different (e.g. different brand name or flavor, such as "regular" or "diet"). Thus, each pallet line 402, 404, 406, 408 supplies a different conveyor 412, 414, 416, 418 leading to an associated magazine loader.

Figure 5:
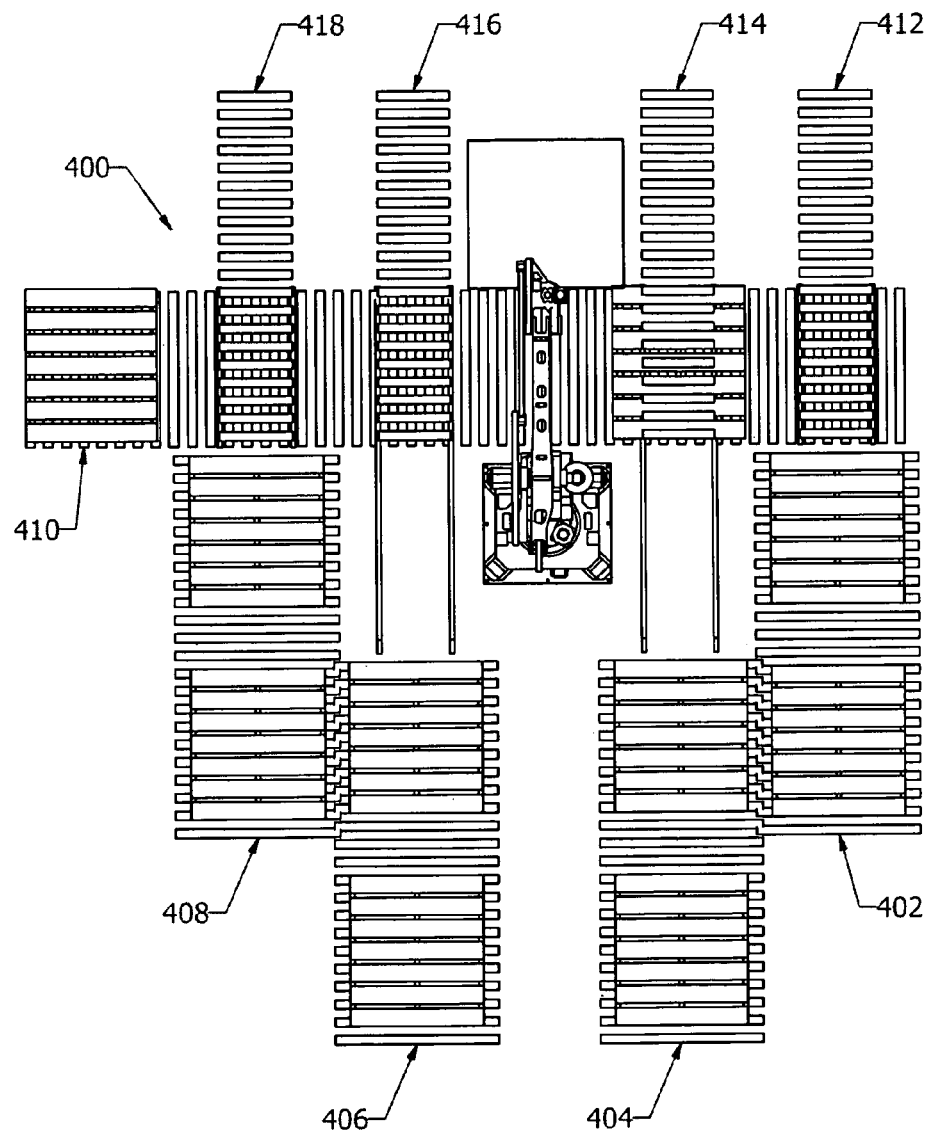
FIG. 5 illustrates an orthographic view of the example of FIG. 4.

FIG. 5 illustrates an orthographic view of the robotic de-palletizer 400 of FIG. 4. Again, the input pallets 402, 404, 406, 408 represent pallets filled with HSC cases full of product. The output pallet conveyor 410 represents pallets that have been emptied.

Figure 6:
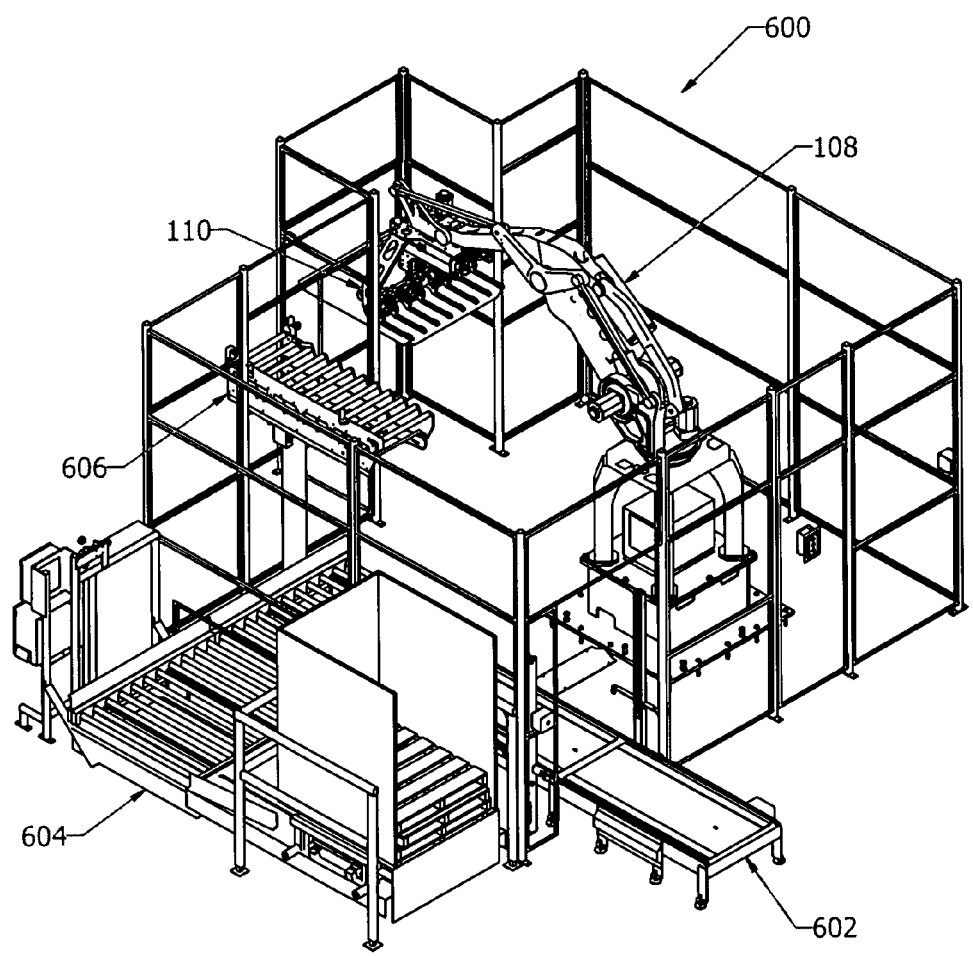
FIG. 6 illustrates an isometric view of an example of a robotic de-palletizer having one input pallet conveyor, one output pallet conveyor and one output conveyor for full HSC.

FIG. 6 illustrates an isometric (i.e. "perspective") view of an example of a robotic de-palletizer 600 similar to that seen in FIG. 1. The robotic de-palletizer 600 includes one input pallet conveyor 602, one output pallet conveyor 604 and one output conveyor 606 for full HSC. In this view, the robotic arm 108 has positioned the EOAT 110 to remove two HSC cases from the input pallet 602. Once removed from the pallet 602, the HSC will be placed on the conveyor 606.

Figure 7:
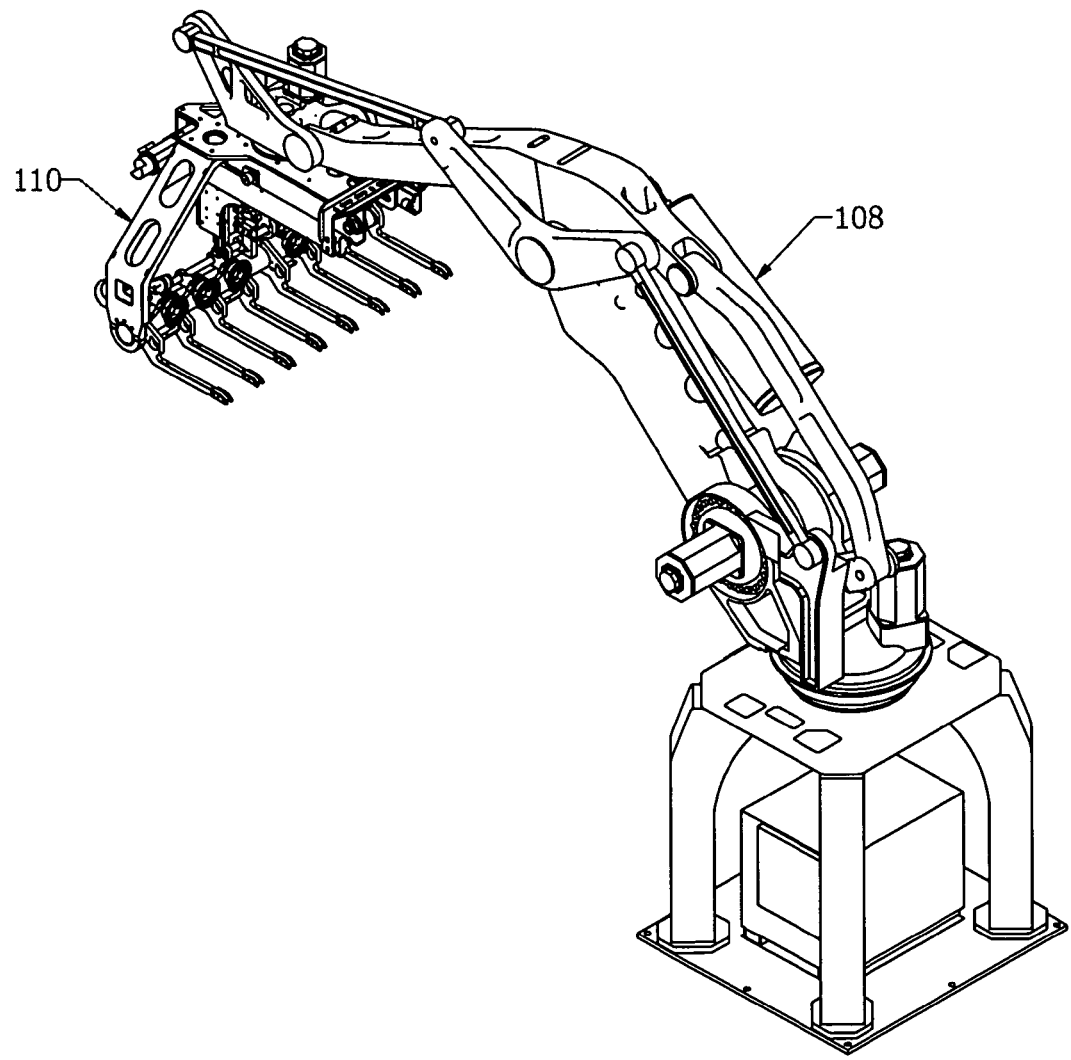
FIG. 7 illustrates an example of a robot arm with an EOAT (end of arm tool) that removes two full HSC at a time from a conveyor within a robotic de-palletizer.

FIG. 7 illustrates an example of a robot arm 108 with an EOAT 110 that removes two HSC at a time, within a robotic de-palletizer system, such as system 600 of FIG. 6. Note that a distinction is often made between the robot arm 108 and the EOAT 110, since robot arms are frequently a commodity, but the EOAT is specialized for a particular application. Also note that while the EOAT is configured to remove two HSC at one time, it could also be configured more generally to remove one or more HSC at a time.

Figure 8:
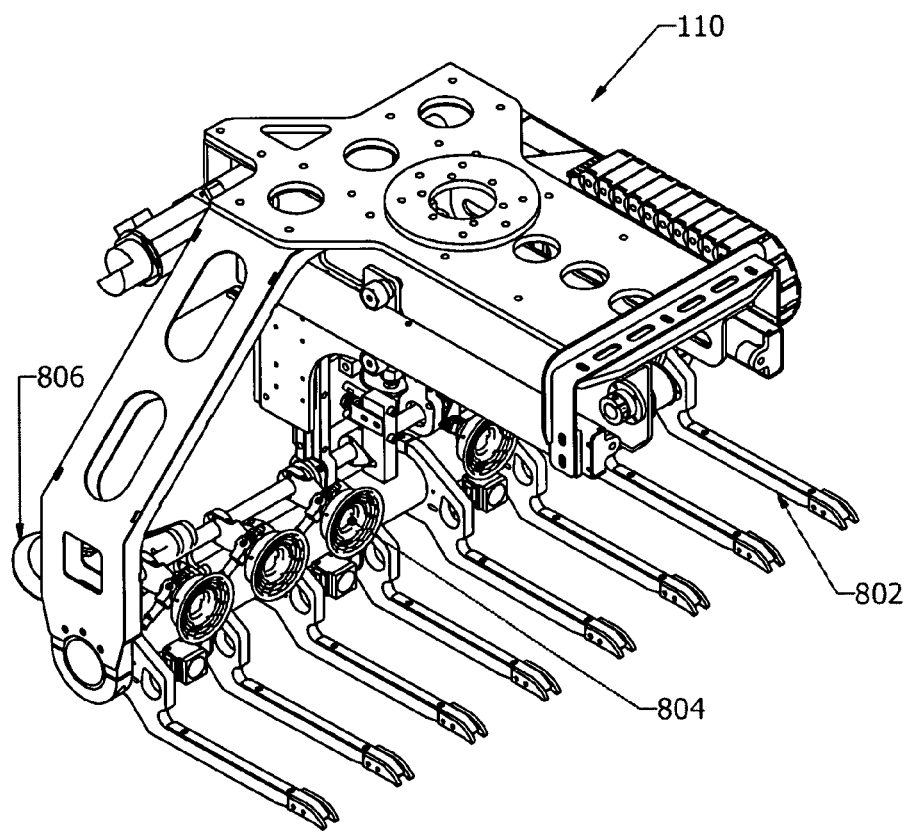
FIG. 8 illustrates detail of the EOAT of FIG. 7 from a first angle.

FIG. 8 illustrates detail of the EOAT 110 of FIG. 7 from a first angle. the EOAT includes a number of prongs 802 to get underneath the HSC and lift. Additionally, a number of suction cups 804 also grasp the HSC. Note that a further suction cup(s) 806 is configured to grasp a sheet (e.g. a cardboard panel) that may separate layers of HSC on the pallet.

Figure 9:
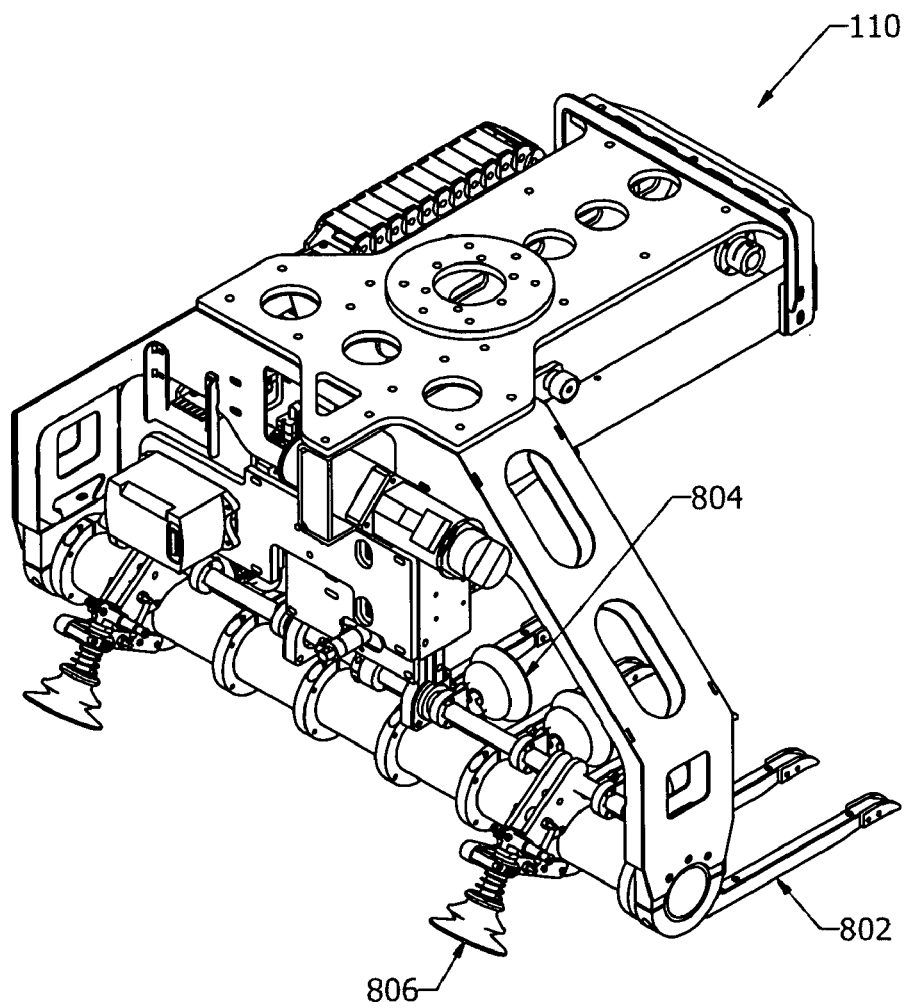
FIG. 9 illustrates detail of the EOAT of FIG. 7 from a second angle.

FIG. 9 illustrates detail of the EOAT 110 of FIG. 7 from a second angle.

Example Robotic Magazine Loader

Figure 10:
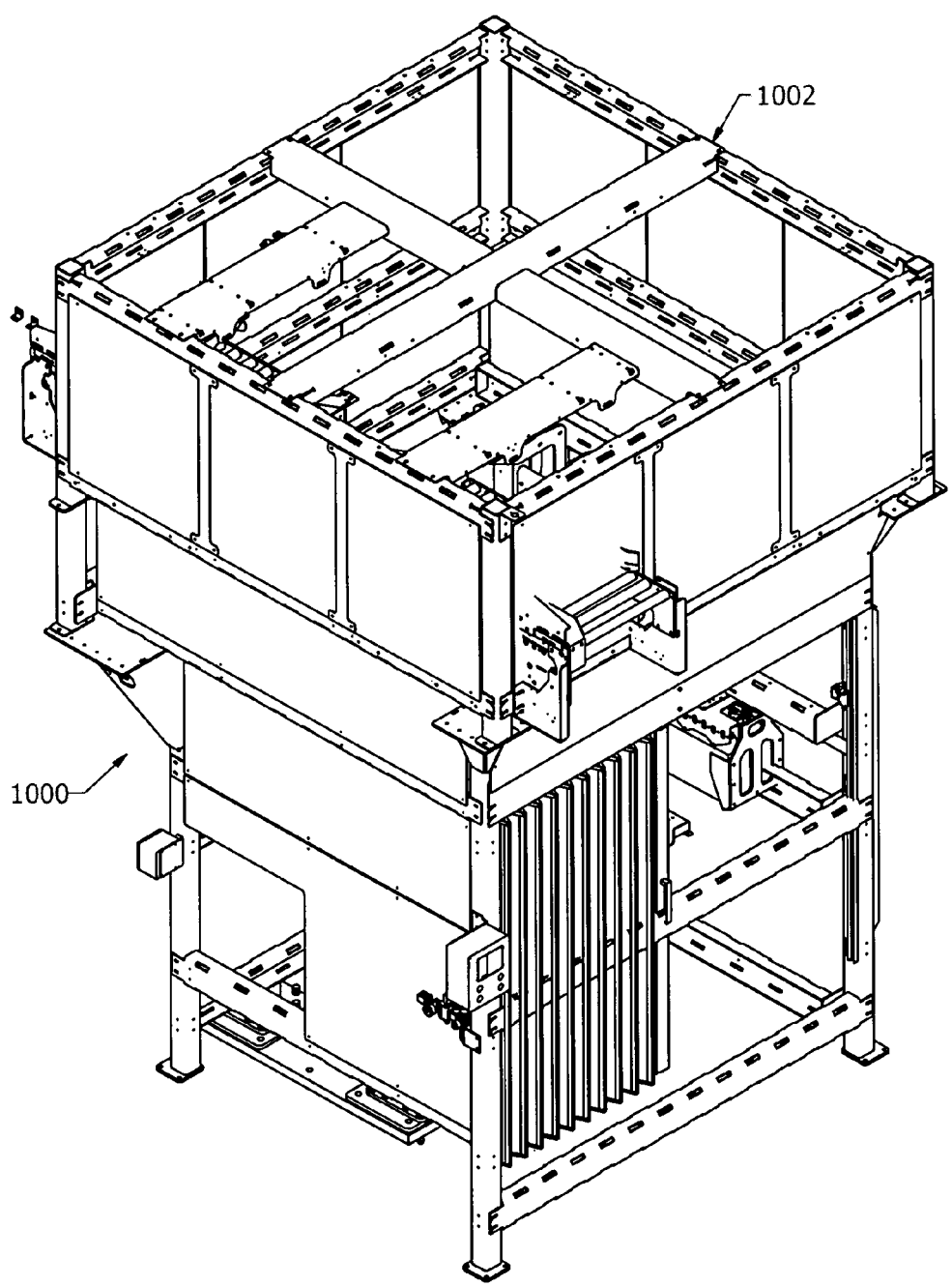
FIG. 10 illustrates an example of a robotic magazine loader, in particular showing portions of the conveyors bringing full HSC into, and empty HSC out of, the magazine-loading area.

FIG. 10 illustrates an example of a robotic magazine loader 1000, in particular showing portions of the conveyor bringing full (i.e. loaded) HSC into the magazine loading area, and empty (i.e. unloaded) HSC out of the magazine loading area. Note that the framework 1002 is designed so that if configured in different mirror images, the parts required for assembly will always be the same. "Can flow" refers to cans of soft drinks, while "carton flow" refers to the cartons that package 12 such cans.

Figure 11:
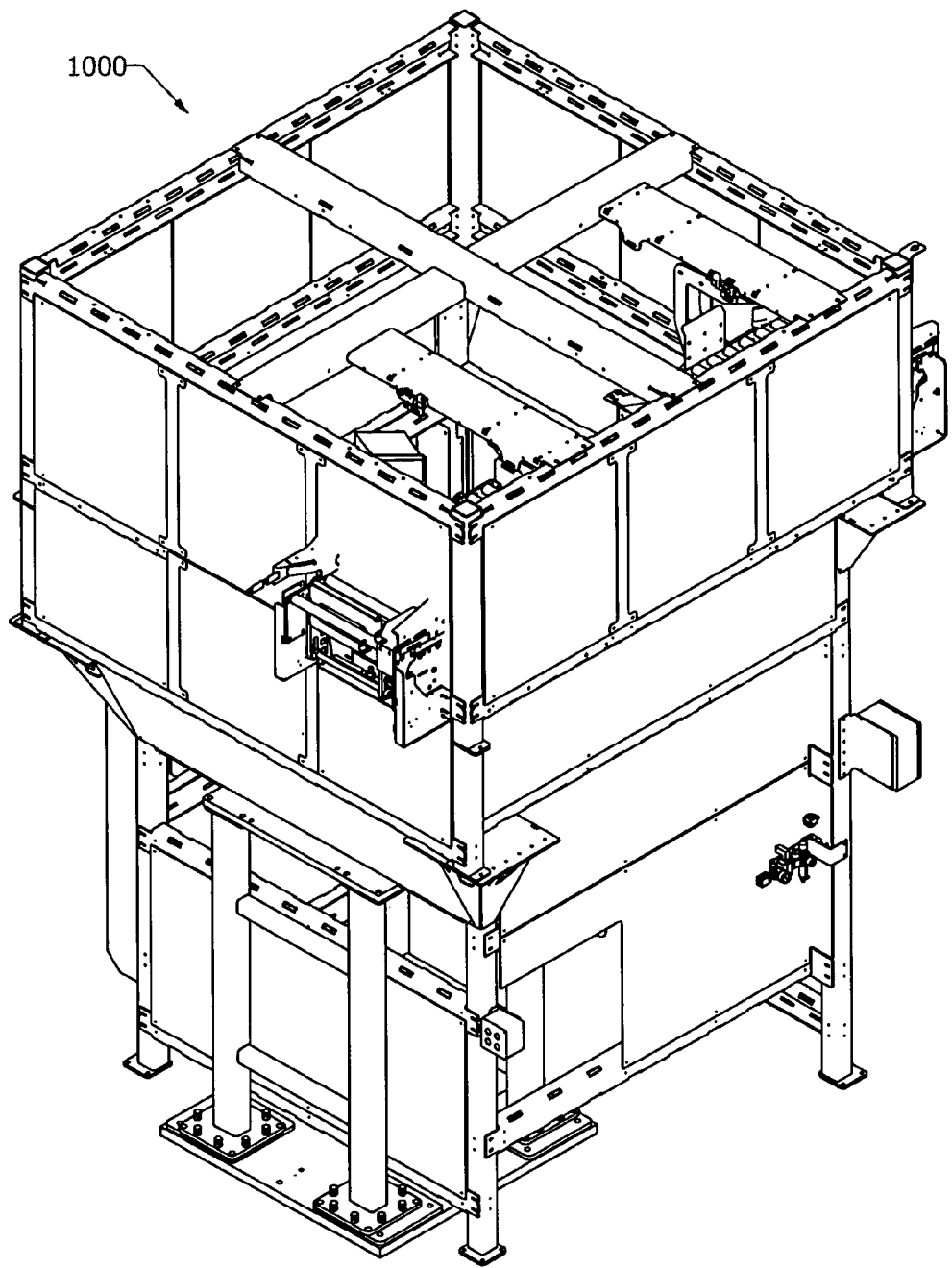
FIG. 11 illustrates an example of the robotic magazine-loader from a different angle.

FIG. 11 illustrates an example of the robotic magazine loader 1000 of FIG. 10 from a different angle.

Figure 12:
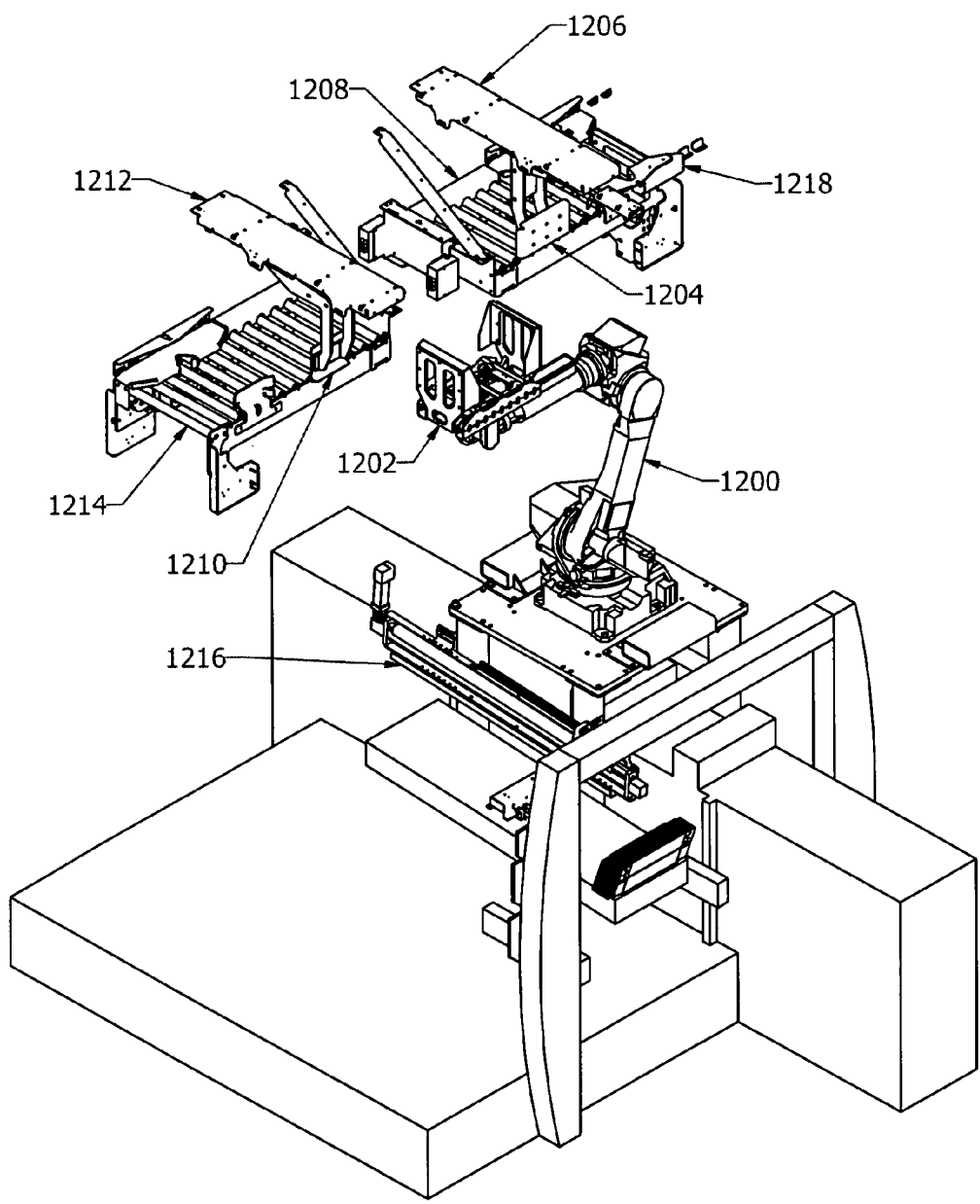
FIG. 12 illustrates an example of a robot arm with an EOAT (end of arm tool) which operates inside the "cage" shown in FIGS. 10 and 11.

FIG. 12 illustrates an example of a robot arm 1200 with an EOAT (end of arm tool) 1202 which operates inside the framework 1002 or "cage" shown in FIGS. 10 and 11. The robot arm 1200 is configured to position the EOAT 1202 to receive full HSC from the conveyor 1208, which are pushed off the input conveyor 1208 and onto the EOAT 1202 by a surface, arm or "pusher" 1204 supported by a track 1206. The robot arm is also configured, once the HSC has been emptied of product, to position the EOAT 1202 by the output conveyor 1214 so that "pusher" 1210 supported by track 1212 can push the empty HSC onto the output conveyor 1214. The paddle follower carriage 1216 is also seen in this view. Also, bar code scanners 1218 (one on each side) scan the HSC. The scanning determines at least two things. First, the scan confirms that the HSC contains product that is usable in the application. Second, by determining which side of the HSC the barcode was on, the system will either rotate the HSC 180 degrees or not. This results in product that is properly oriented within the magazine.

Figure 13:
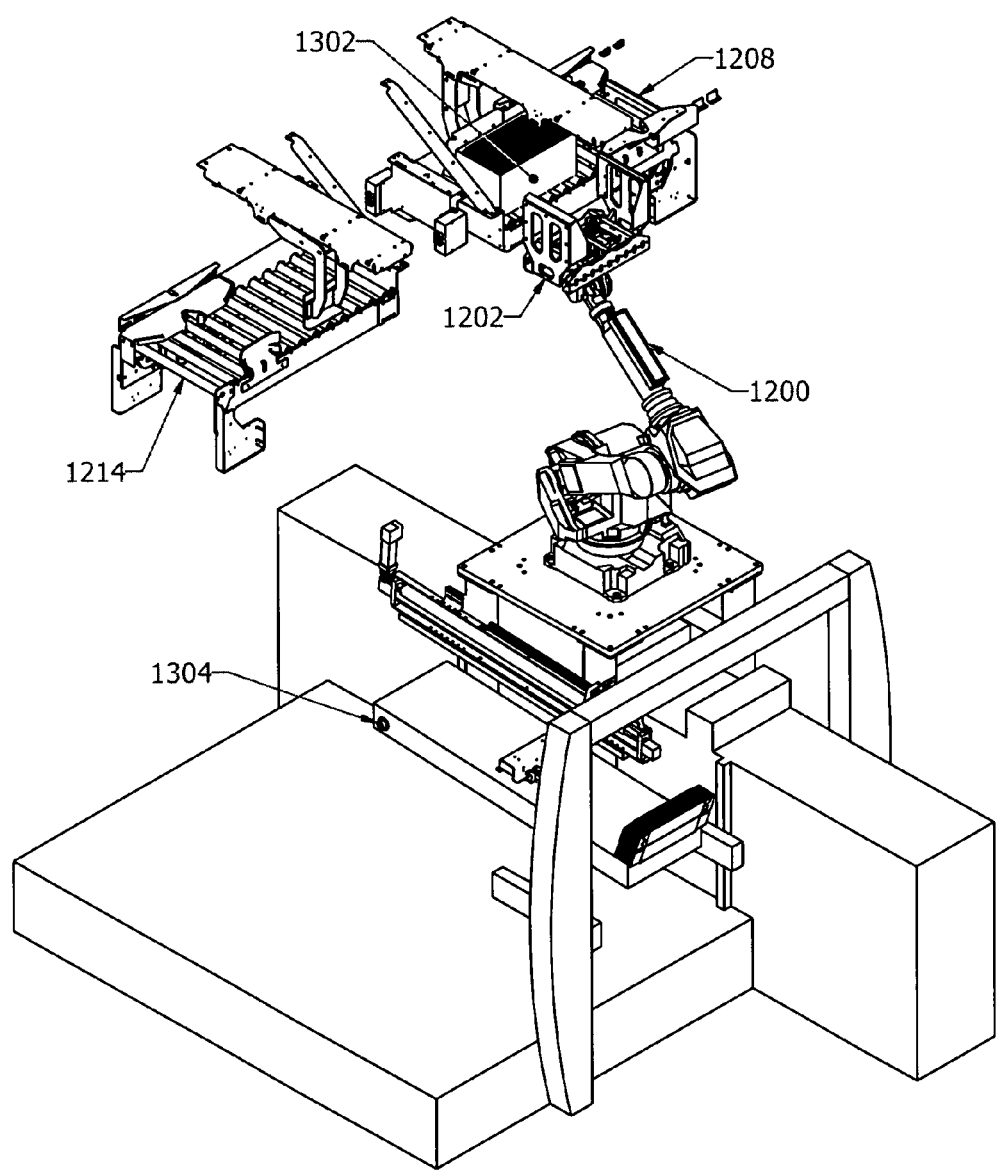
FIG. 13 illustrates an example of the EOAT preparing to receive a full HSC from the input conveyor.

FIG. 13 illustrates an example of the EOAT 1202 preparing to receive a full HSC 1302 from the input conveyor 1208. Thus, the pusher (better seen in FIG. 12 as 1204) will push the full (i.e. loaded with product) HSC 1302 off the input conveyor 1208 and onto the end of arm tool 1202. The output conveyor 1214 is typically not productive at this time. An encoder 1304 is configured to provide information about the movement and/or location of the magazine. In a typical application, the encoder 1304 provides "relative" information, i.e. information that describes how much the magazine has moved, and not information about a precise location of the magazine. However, the encoder could alternatively and/or additionally provide absolute information including precise information about the location of the magazine.

Figure 14:
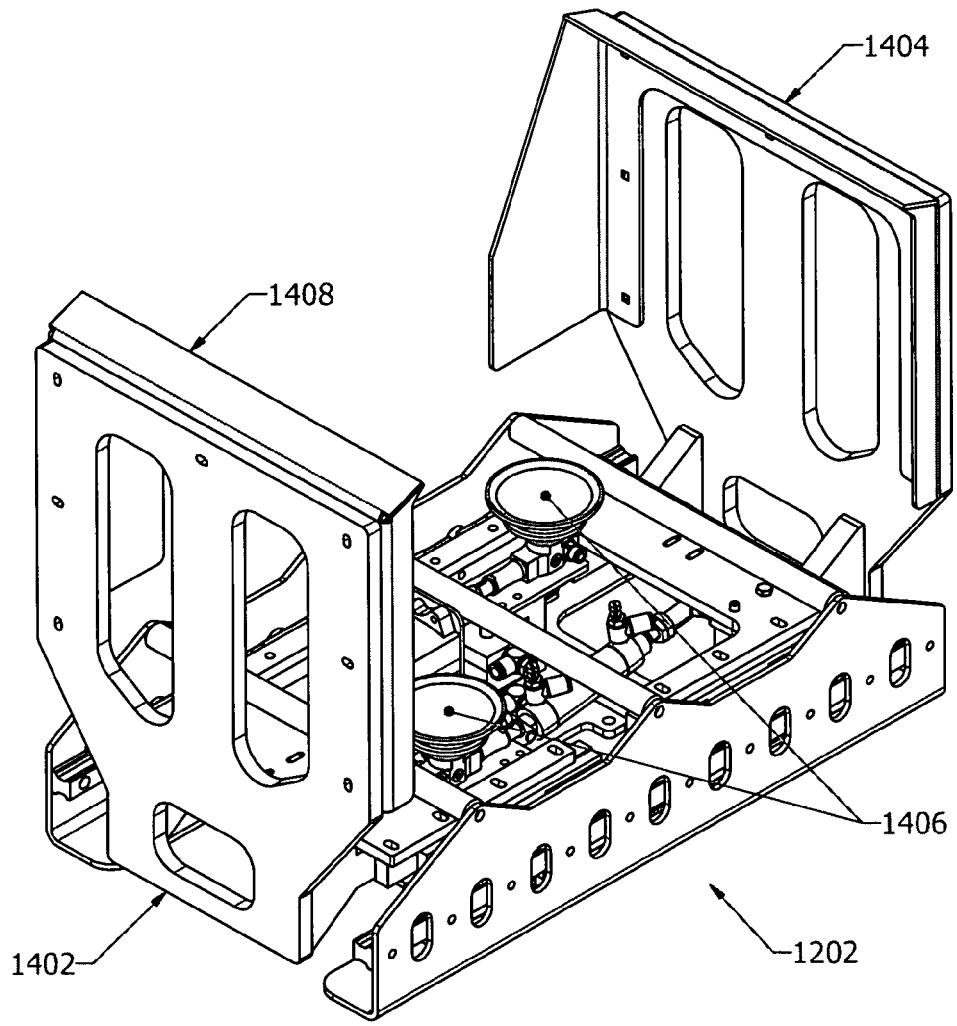
FIG. 14 illustrates an example close-up view of the EOAT, showing vertically standing side panels which squeeze an HSC and showing suction cups which grasp the bottom of the HSC.

FIG. 14 illustrates an example close-up view of the EOAT 1202, showing vertically standing left and right side panels 1402, 1404 and suction cups 1406. The side panels 1402, 1404 are configured to enclose an HSC, and opposed ends of each product item within the HSC are retained by opposed flanges 1408 extending from each side panel. Additionally, the suction cups 1406 grasp the bottom of the HSC. (Note, a full HSC 1302 is seen in FIG. 13.)

Figure 15:
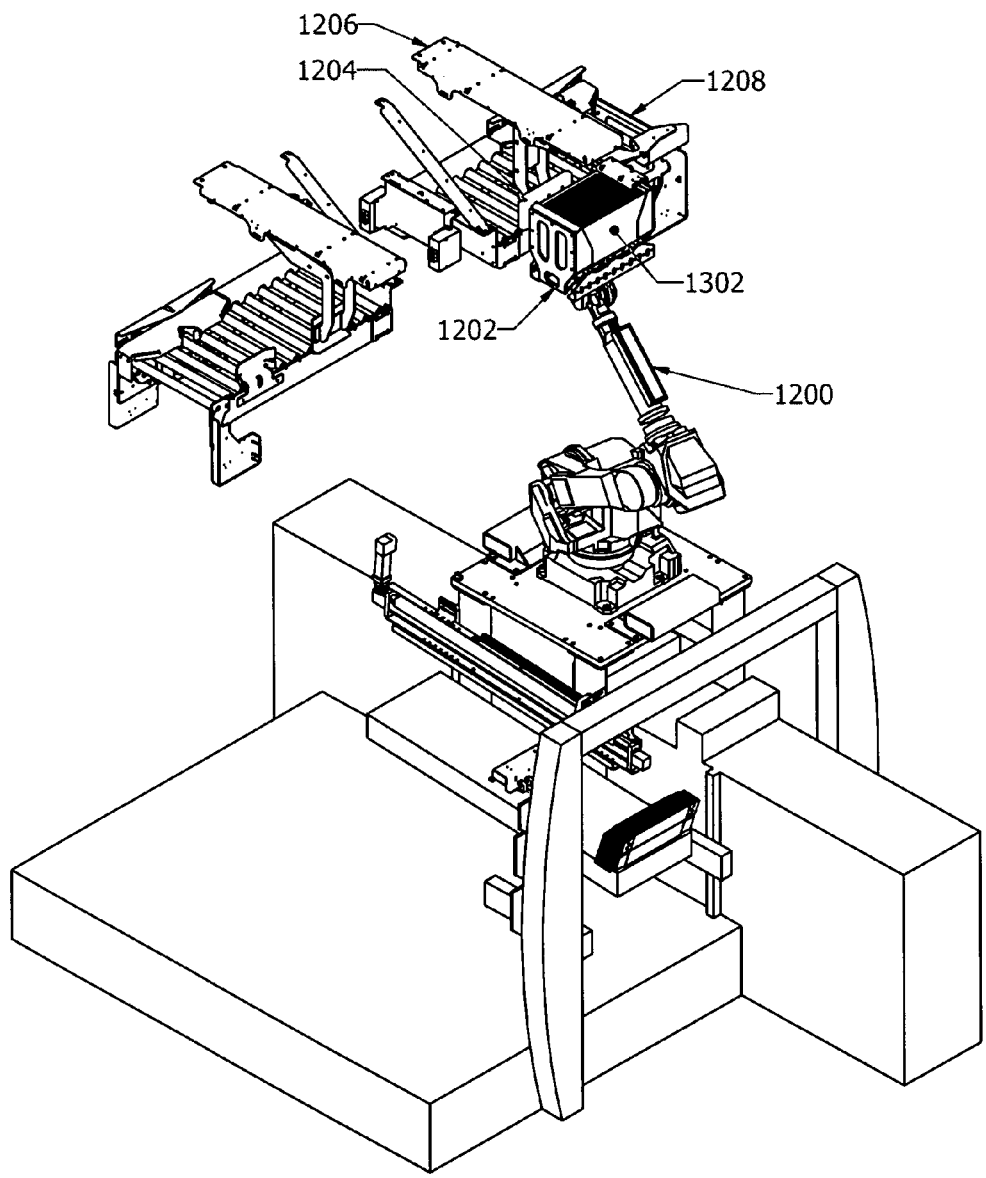
FIG. 15 illustrates an example of the EOAT receiving a full HSC, wherein the HSC contains a full load of "product," e.g. cartons to be assembled and filled with merchandise.

FIG. 15 follows the action seen in FIG. 13. In particular, FIG. 15 illustrates an example of the EOAT 1202 receiving a full HSC 1302, wherein the HSC contains a full load of "product," e.g. cartons to be assembled and filled with merchandise. The HSC has just been pushed from the conveyor 1208 by the pusher 1204 (much better seen in FIG. 12) sliding on tracks 1206.

Figure 16:
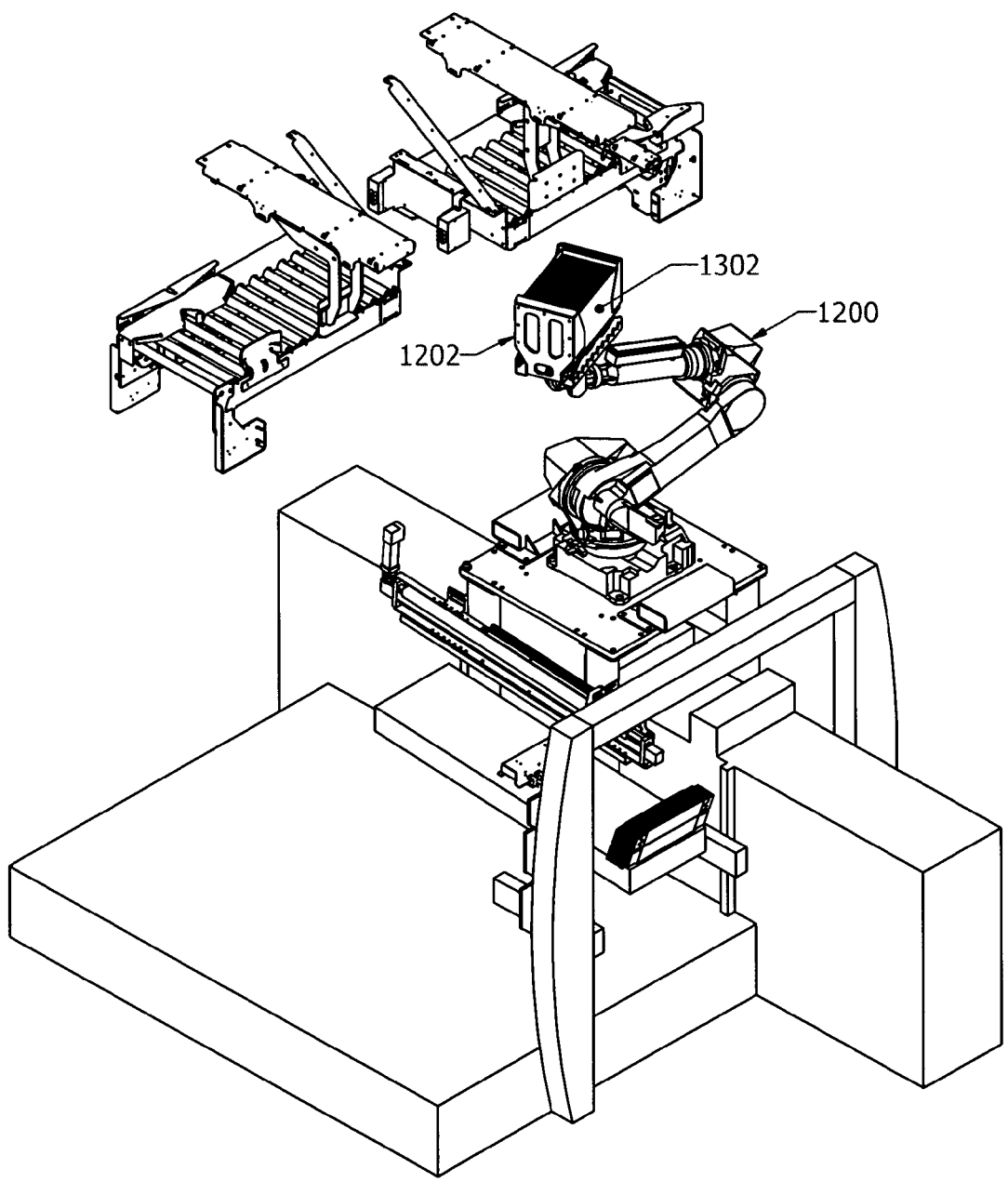
FIG. 16 illustrates an example of the EOAT moving the HSC, still oriented right side up, into position to add the product to the magazine.

FIG. 16 illustrates an example of the EOAT 1202 moving the HSC 1302, still oriented right-side-up, into position to add the product to the magazine. Note that a 180-degree rotation may be required, depending on the location of the barcode on the side of the HSC, to properly orient the product within the HSC.

Figure 17:
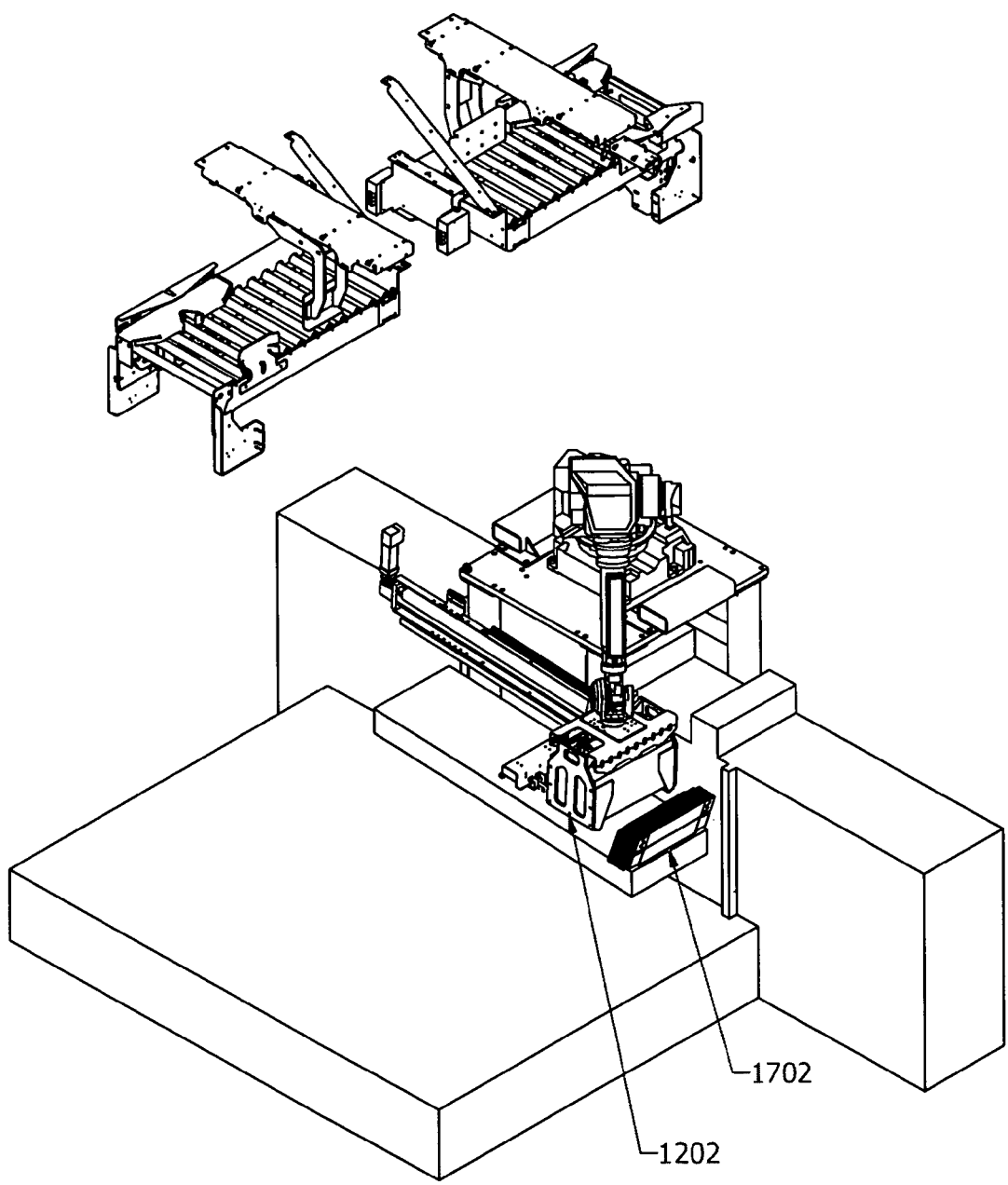
FIG. 17 illustrates an example of the EOAT inverting the HSC into position in the magazine and preparing to "dump" the product into a carefully-selected location in the magazine.

FIG. 17 illustrates an example of the EOAT 1202 inverting the HSC 1302 into position over the magazine 1702 and preparing to "dump" the product into a carefully-selected location on the magazine.

Figure 18:
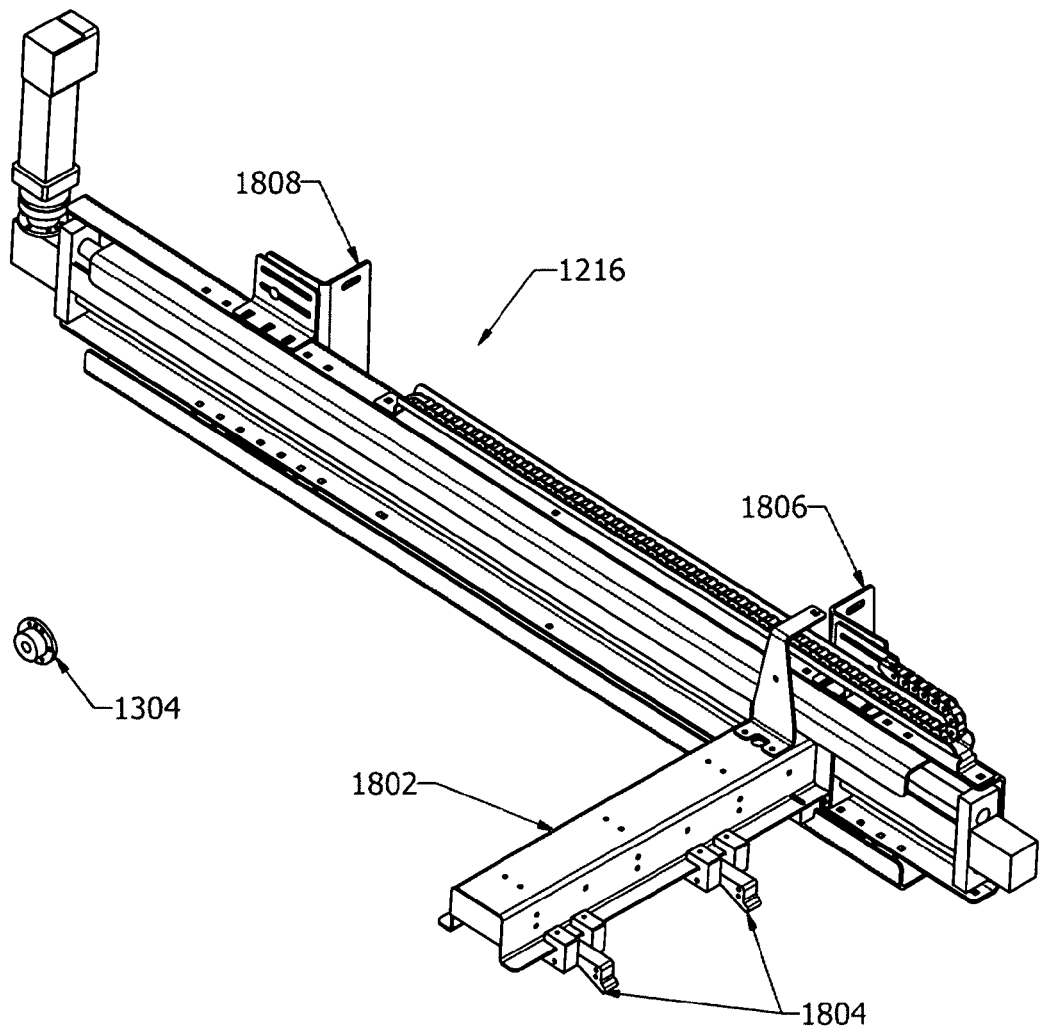
FIG. 18 illustrates an example of a paddle follower carriage, which advances an arm into contact with the last carton in the magazine, thereby monitoring the end of stack position within the magazine and helping to prevent the last cartons from tipping backward.

FIG. 18 illustrates an example of a paddle follower carriage 1216, which aids in organizing and orienting the product in the magazine. The paddle follower includes an arm 1802 and associated fingers 1804 that detect the end of stack (end of cartons) within the magazine and follows the end of the cartons as cartons are removed from the magazine. Tabs 1806, 1808 mount the paddle follower arm to the robot riser. An encoder 1304 tracks movement and/or location of the magazine 1702 (see FIG. 17). The encoder 1304 can be mounted on the magazine, on a drive mechanism configured to move the magazine, or on an appropriate device for a particular application.

Figure 19:
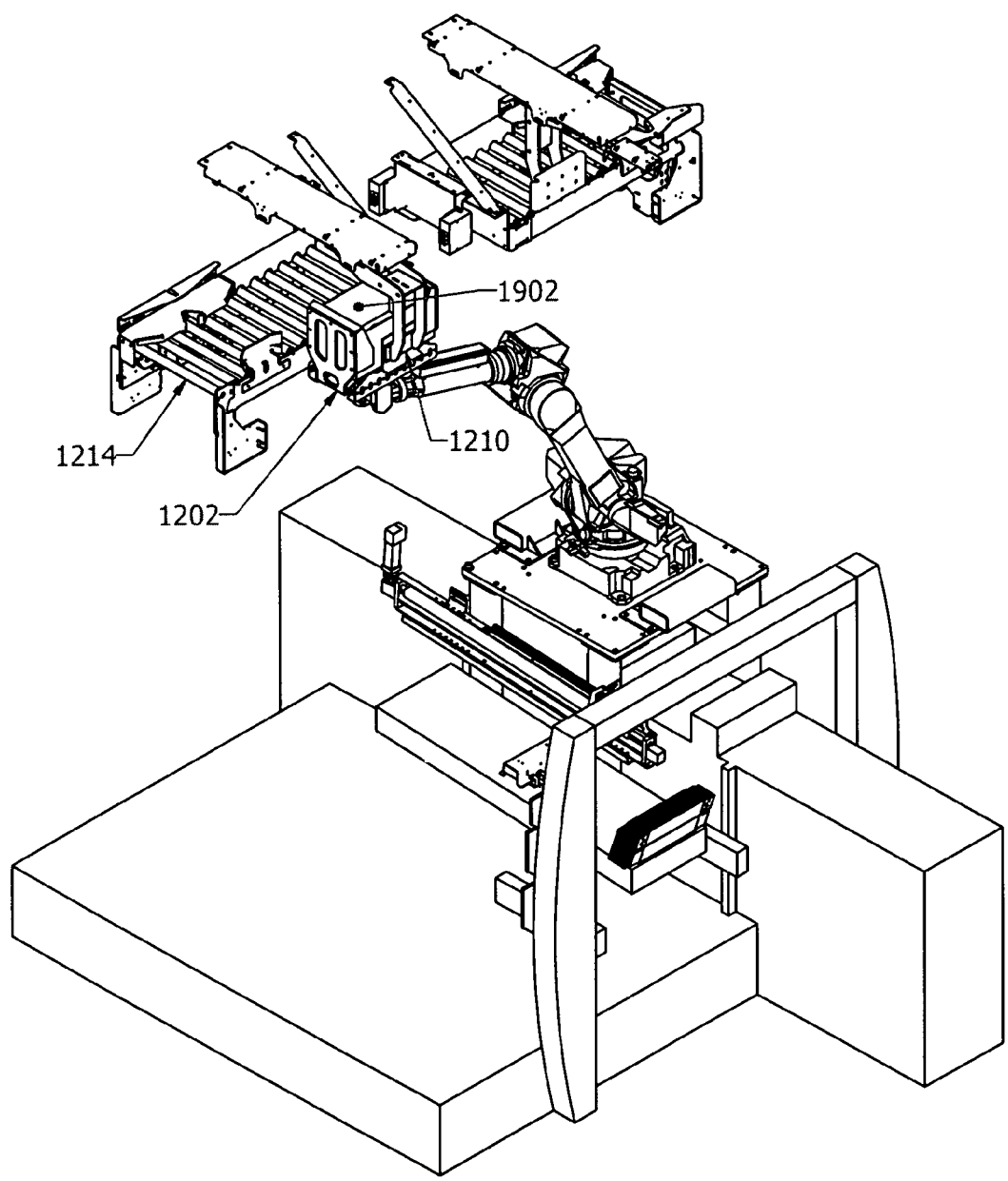
FIG. 19 illustrates an example of the EOAT maneuvering the empty HSC into position for removal to the discharge conveyor.

FIG. 19 illustrates an example of the EOAT 1202 maneuvering the empty HSC 1902 into position on the discharge conveyor 1214 for delivery to a waste storage area. In particular, the pushing surface 1210 (much better seen in FIG. 12) pushes the empty HSC 1902 from the EOAT 1202 to the conveyor 1214.

Figure 20:
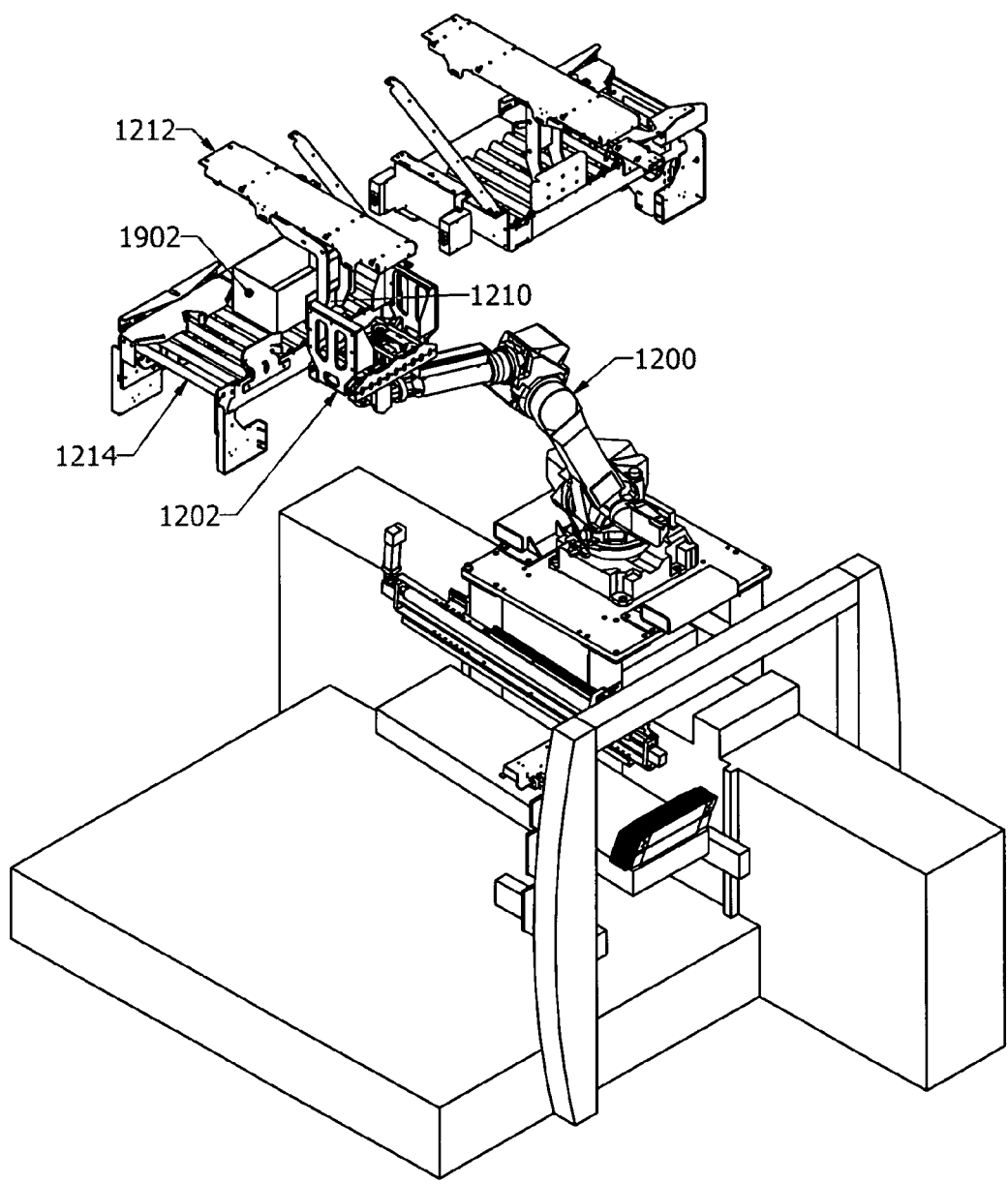
FIG. 20 illustrates an example of a pushing device moving the empty HSC from the EOAT to the discharge conveyor.

FIG. 20 illustrates an example of a pushing device 1210 (better seen in FIG. 12) moving the empty HSC 1902 from the EOAT 1202 to the discharge conveyor 1214.

Figure 21:
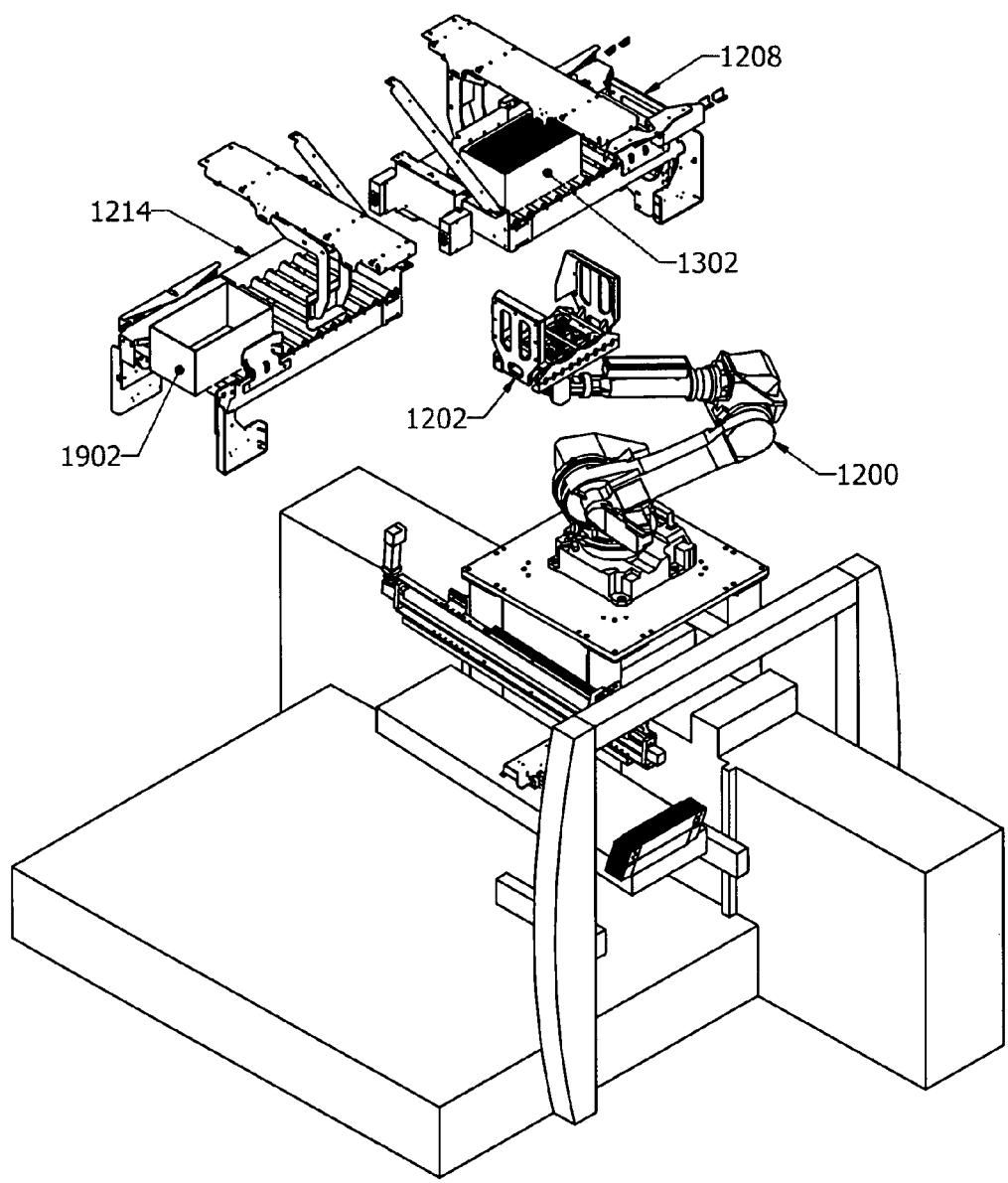
FIG. 21 illustrates an example of the EOAT moving to position adjacent to the input conveyor to receive a full HSC while the discharge conveyor removes the empty HSC.

FIG. 21 illustrates an example of the EOAT 1202 moving from a position adjacent to the output conveyor 1214 to a position adjacent to the input conveyor 1208 to receive a full HSC 1302 as the discharge conveyor 1214 removes the empty HSC 1902.

Example of an Automatic Carton Loader

To assist in the illustration of a magazine-loading device, an example of a structural configuration for a CMLD (carton magazine loading device) is discussed below. This example is for purposes of illustration only, and is not intended to express apparatus or system requirements, only to illustrate the concepts discussed. The example CMLD includes:

1) Product in-feed system consisting of the following:

a. Photo eyes to alert the system that product is present. (Note: product in this context can be an HSC (half-slotted cases, e.g. cardboard boxes having slots defined in their sidewalls) full of disassembled cartons. Usually, disassembled means folded flat, and ready for assembly. The cartons could be, for example, the cartons within which 12 cans of soft drink are sold, or any of hundreds of different cartons.)

b. A popup case stop to meter product (HSC full of cartons) one at a time into the system and control line pressure of any accumulated product.

c. Two opposing bar code scanners to determine product size, flavor and orientation.

d. A conveyor to deliver product to the load position.

e. Guiding necessary to contain the product.

f. A pushing device to load the product from the conveyor into the EOAT (End of Arm Tool) of the robot.

g. Sensor to confirm that a product is in the load ready position.

2. Articulated arm robotic system consisting of the following:

a. A 6-axis articulated arm robot with enough reach and payload to deliver full product (e.g. an HSC full of disassembled cartons) from the in-feed system to the discharge system. In one example application, a 70 kg total payload robot could be used. Care must be exercised to match the actual payload with the rating of the equipment used.

b. An end of arm tool (EOAT) mounted on the end of the 6-axis articulated robot arm should be capable of receiving a full HSC (half-slotted case) and containing the product while being inverted and reoriented. The EOAT must then be capable of delivering the product (cartons within the HSC) to a magazine. The magazine is a moving mechanism that is "downstream" from the aspects disclosed in the instant specification. The product must be delivered in proper orientation to a proper location, and must not disturb the existing product already in the magazine. The EOAT is also configured to deliver the empty HSC to a Dunnage Removal System after the product (e.g. folded cartons) have been delivered to the magazine. Once delivered, the empty HSC should be easily removable from the EOAT.

c. A mount for the robot that allows the robot to be mounted is such a way that the robot can access all necessary points and not interfere with the Magazine device or the packer product in-feed.

3. Dunnage Removal System consisting of the following:

a. A pushing device to remove the empty container from the EOAT and place it on a conveyor.

b. A conveyor to remove the empty HSC from the system to a transportation device (conveyor, chute, etc.).

4. Product containment device consisting of the following:

a. A containment paddle may be configured with linear travel parallel to the magazine deck. This paddle may provide positional feedback to the control system.

b. Dual sensors to determine the exact position of the product (disassembled (folded flat) cartons for assembly by machinery downstream from the machinery discussed in this specification) that has previously been placed on the magazine.

c. A top tamping device to condition the product vertically, i.e. to tap on the top of cartons within the magazine, prior to the cartons' entrance to final stages of the magazine.

d. A side pusher device to condition the product horizontally, i.e. to tap on the sides of cartons within the magazine, prior to the cartons' entrance to final stages of the magazine.

e. An air jet to remove any product (e.g. cartons) that has been misplaced on the magazine prior to entering a pick zone of the magazine (i.e. a zone wherein the cartons are removed from the magazine).

f. An encoder or other feedback device attached to the magazine to determine movement and speed of the magazine.

5. Frame work and guarding consisting of the following:

a. Modular frame that can mount all systems and can easily be field installed with minimal impact of existing machinery and structures. Framework must allow for multiple configurations without any changes in the parts list to allow installation in different plants with different limitations and line layouts.

b. A guarding system that can be configured to allow multiple configurations and allow manual loading of the magazine when necessary. Access to the magazine, the loader it feeds and that product must be available to the operator.

Functional Operation of a Magazine Loading Device

To assist in the illustration of a magazine-loading device, an example of a functional operation of a CMLD (carton magazine loading device) is discussed below. This example is for purposes of illustration only, and is not intended to express apparatus or system requirements, only to illustrate the concepts discussed.

In one example of the operation of a Carton Magazine Loader can be understood by reference to FIG. 22 and the discussion below. In this example, the Robotic Carton Magazine Loader (CMLD-carton magazine loading device) will receive HSCs (half slotted cases, e.g. cardboard boxes having slots defined in their side walls) full of cartons in a narrow side leading orientation from a customer supplied conveyor. (Note that the cartons are in a "folded flat" configuration, and will be opened and filled by machinery beyond the scope of the discussion herein. Thus, at this point, an HSC is a box full of disassembled (folded flat) cartons which will later be opened.) The CMLD will communicate with a de-palletizing device to keep track of how many products have been de-palletized (i.e. removed from a pallet), how many loaded, and how many left in the current "run." Note that a "run" is sometimes referred to as a "flavor run" and indicates that a type of carton is being used (corresponding to a "flavor" of soft drink, for example). This total quantity to load is an input value from the operator and can be modified throughout the run. This is done to prevent unnecessary accumulation of product (e.g. folded flat cartons) and minimize product cleanout at the end of the run. The CMLD will meter one case of product into the system. The CMLD will scan both sides of the incoming HSC for a bar code on the case. The code is located on one side only. Information in the bar code will indicate the product size and flavor. The position of the code (left or right side) will determine orientation. The robot will move the EOAT to a load-ready position, with sides of the EOAT open to receive product. Once there is enough empty space on the magazine, a pusher will push the product off the in-feed conveyor and into the EOAT. Once the EOAT is loaded the sides of the EOAT will close or adjust to contain or otherwise support and control movement of the HSC. Vacuum cups will actuate up and establish vacuum on the bottom of the HSC. The HSC is now contained within the EOAT. The robot will move the Product away from the in-feed conveyor and invert the HSC over the top of the magazine. The HSC is inverted because the top of the HSC is open, and the product is "dumped" out of the HSC through this open top. Depending on the orientation determined from the bar code scanners, the robot will either leave the product in that orientation or rotate the product 180 degrees to properly orient the product to the magazine. The robot will then rock the EOAT back and forth to ensure the product is freely moving within the HSC and properly indexed to the leading edge of the HSC. This prevents gaps in the product on the magazine.

The robot will now translate to a position based on the paddle follower location (see paddle follower description below). The follower will retract allowing space for the EOAT. The EOAT will move down to the deck level of the magazine. The sides of the EOAT will open to allow the product to freely drop to the magazine. The vacuum cups maintain control of the HSC. The robot will then move up slightly to allow the product to be approximately 75% removed from the HSC. The paddle follower can now re-engage the stack of product on the magazine. The robot will then move slightly forward to feather the product to match the angle of the existing product on the magazine. The robot will then move up to allow the product to be fully disengaged from the HSC. The sides of the EOAT close to fully contain the HSC. The robot then moves to a position to facilitate removal of the HSC onto the Dunnage removal system. The sides of the EOAT open and vacuum is released. The pusher then pushes the empty HSC out of the EOAT and onto the discharge system where it is conveyed out of the system. The robot then moves the EOAT to the load-ready position next to the in-feed system and waits until there is room for more product on the magazine. Once there is room for new product on the magazine, the cycle repeats.

Figure 22A:
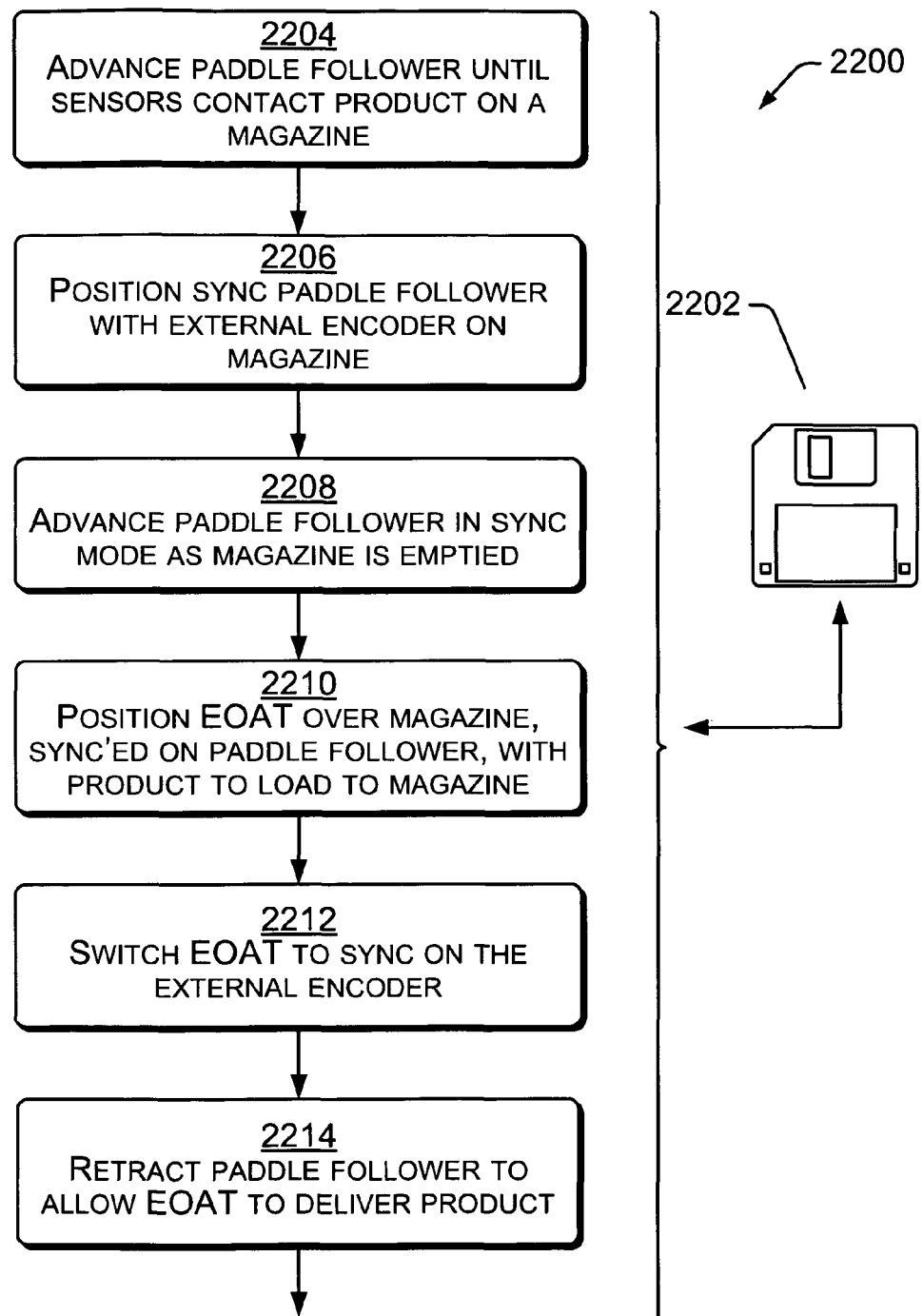
FIG. 22, arranged in two parts as FIGS. 22A and 22B, illustrates an example of the operation of a magazine loader.
Figure 22B:
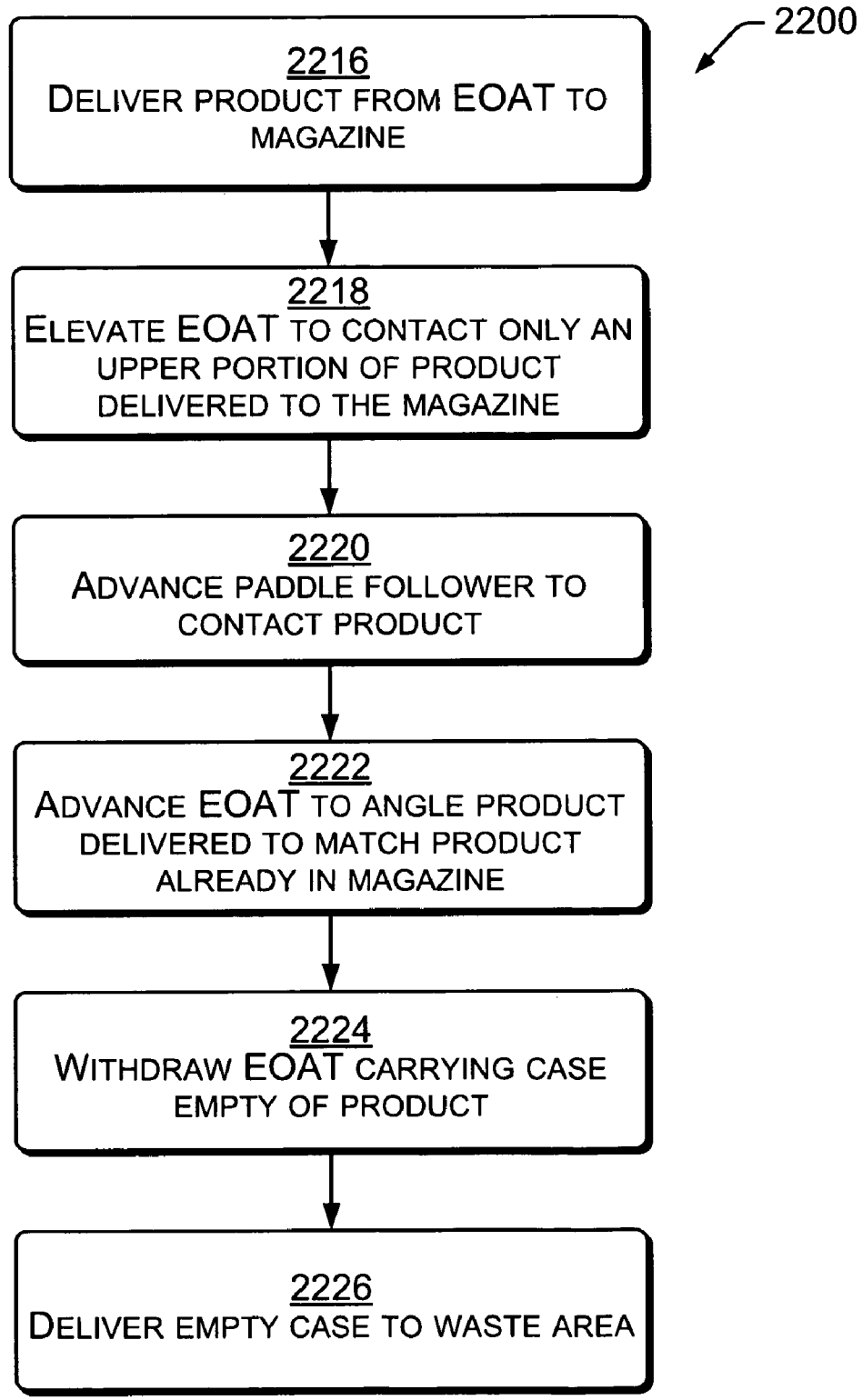

Referring to FIG. 22, a method 2200 of operating a magazine loading apparatus can be understood. In one example, the method may be implemented by software statements and instructions defined on a computer readable media 2202. The method can be utilized, for example, to load product into a magazine. For purposes of illustration only, the product can be folded (i.e. unassembled) boxes. Such boxes, when assembled, may contain twelve 12-ounce soft drink cans. A wide range of alternative product could alternatively be loaded into/onto the magazine.

One example of the method 2200 involves use of a magazine loading apparatus having a paddle follower, at least two encoders and a product delivery device (tool). Two examples of product delivery devices include robot arms with end-of-arm-tools and gantry-based devices having product-moving structures. In the example of FIG. 22, a robot arm with an EOAT (end of arm tool) is provided to load product into the magazine. The paddle follower "follows" the stack of product (e.g. the unassembled boxes, within the magazine). By following the stack of product, the paddle follower makes sure product elements within the stack don't fall backwards, and determines an end of stack position (generally, the position of the 'last' or 'trailing' product element in the stack). Encoders provided positional information, i.e. encoders sense and measure movement. A first encoder is located appropriately to report location and movement of the paddle follower. A second encoder 1304 (an example of which is seen in FIG. 18) is located appropriately to report location and movement of the magazine as the magazine delivers product for consumption. Such an encoder may be considered to be an "external" encoder, because it can be added (perhaps externally) to an already existing magazine as part of installation of the magazine loading apparatus. The paddle follower encoder gives direct positional information and the external encoder gives relative position information. That is, the paddle follower encoder provides information precisely locating the paddle follower at all times. The external encoder, mounted to the magazine, indicates movement of the magazine, and thereby provides indirect or relative position information that can be used to advance the paddle follower.

Referring to block 2204 of FIG. 22, the paddle follower advances until sensors in the paddle follower contact product, such as unassembled boxes, on a magazine. For example, at startup and following a process during which product was loaded onto the magazine, the paddle follower arm advances until sensors (typically located on the paddle) detect the product on the magazine.

At block 2206, the paddle follower does a position-sync with the external encoder on the magazine. That is, upon contact with product on the magazine, the paddle follower assumes a mode of operation wherein information from the external encoder (i.e. the encoder reporting on the location and movement of the magazine) is used to control movement of the paddle follower. Thus, detection of the trailing product item by sensors on the paddle follower initiates the sync with the second encoder, whereby the paddle follower moves in synchronicity with the magazine. As the paddle follower moves according to the encoder on the magazine, the sensors on the paddle follower provide a confirmation, redundant to input from the magazine position encoder, that the paddle follower is in contact with the trailing product item.

At block 2208, in accordance with the position sync, the paddle follower advances with a movement synchronized to movement of the magazine as the magazine is emptied. For example, if the magazine advances two inches, then the paddle follower advances two inches. Note that the magazine's 2-inch advancement was in response to a delivery of a number of product elements, which occupied a 2-inch space, to an apparatus receiving product from the magazine. The sensors on the paddle follower act as a double check to make sure the follower stays in contact with the product stack within the magazine.

At block 2210, the robot and EOAT is positioned over the magazine. The EOAT grasps, cradles, lifts, carries, or otherwise moves product for delivery (i.e. loading) to the magazine, wherein the product is typically contained within a carton or case (i.e. a box). Initially, the EOAT's position over the magazine is synchronized to the paddle follower, and ultimately, to the encoder associated with movement of the paddle follower. That is, the robot and EOAT moves to a load position, and may adjust that position, based on the paddle follower position.

At block 2212, the robot and/or EOAT switches modes and syncs with the external encoder, which tracks movement of the magazine. Thus, the EOAT originally synced with the paddle follower, but then switches to sync on the magazine encoder. Accordingly, if the magazine advances, the robot arm will move the EOAT to follow. Thus, the system monitors for movement of the magazine. Where such movement is detected, the paddle follower updates its location according to a relative offset (i.e. movement of the external encoder describing location and movement of the magazine).

At block 2214, the paddle follower retracts. The retraction is a negative offset movement in a direction opposite the direction of product movement in the magazine. The paddle follower retracts enough to allow the EOAT to move directly behind the existing product on the magazine.

At block 2216, the EOAT delivers product to the magazine. FIG. 17 illustrates an example of the EOAT 1202 inverting the HSC 1302 into position over the magazine 1702 and preparing to deposit the product onto the magazine. The product is delivered to a location between an original position of the paddle follower before retraction, and a position of the paddle follower after retraction. Referring to the example EOAT in FIG. 14, it can be seen how retraction of the flanges 1408 on the side panels 1404 releases the product, since opposed ends of each product item are retained by the opposed flanges 1408. While the product is released, the HSC 1302 containing the product is retained by the suction cups 1406.

At block 2218, the EOAT elevates so that the EOAT, and/or the HSC 1302 or other surface contacts only an upper portion of the product. The weight of the product newly added to the magazine is now supported by the magazine. However, the EOAT is in a position such that its movement may be used to tilt the newly added product to a desired angle to match product already in the magazine.

At block 2220, the paddle follower then advances (as discussed above, with respect to block 2204) until the sensors have detected the back (i.e. trailing item) of the stack of product on the magazine. Note that because new product was added to the magazine, the original trailing item is no longer the trailing item, and a new item (from among the product added to the magazine) is the trailing item. Upon sensor confirmation of contact with the product in the magazine, the paddle follower switches modes to a position-sync mode wherein the paddle follower moves in synchronous movement with the encoder on the magazine (as discussed at block 2206). The paddle follower maintains contact with the stack until the robot and EOAT has returned with the additional product to be delivered to the magazine and the process repeats.

At block 2222, the EOAT is then advanced slightly, if needed, to tilt newly added product items to the angle of existing product items within the magazine. Accordingly, the EOAT "feathers" the product, by tilting it to assume an angle of repose of product already on the magazine. Thus, if the previously existing product on the magazine was tilted to lean slightly in the direction of product movement toward a consuming device, then the EOAT brushes the upper portion of the newly added product, causing it to lean in the direction of the previously existing product.

At block 2224, the EOAT then withdraws from the area of the magazine, lifting the empty case 1302 (such as by suction cups 1406 in FIG. 14) to fully separate that case from the product it contained, which is now left on the magazine.

At block 2226, the case 1302 is delivered to a waste removal area. For example, FIG. 19 shows an example of how a case 1302 can be moved to a waste storage area by conveyor 1214.

Conclusion

Although aspects of this disclosure include language specifically describing structural and/or methodological features of preferred embodiments, it is to be understood that the appended claims are not limited to the specific features or acts described. Rather, the specific features and method steps are disclosed only as examples, and are representative of more general concepts.

The invention claimed is:

1. A method of loading product into a magazine, comprising:
   advancing a paddle follower to track a trailing product item in the magazine, wherein the product is advanced into a consuming device by the magazine;
   applying sufficient pressure against the trailing product item, with the paddle follower, to keep the trailing product item upright and leaning in a direction of product movement;
   tracking movement of the paddle follower with a first encoder;
   tracking movement of the magazine with a second encoder;
   advancing the paddle follower synchronously with the second encoder as product is consumed;
   moving an EOAT (end of arm tool), carrying additional product to be loaded into the magazine, synchronously with the paddle follower according to the first encoder prior to retraction of the paddle follower;
   retracting the paddle follower from the trailing product item;
   moving the EOAT synchronously with the magazine according to the second encoder after retraction of the paddle follower;
   loading the additional product into the magazine with an EOAT; and
   advancing the paddle follower to contact a new trailing product item.

2. The method of claim 1, additionally comprising sensing the new trailing product item with at least one sensor carried by the paddle follower and in response switching the paddle follower to a mode of operation wherein the paddle follower moves in response to the second encoder tracking movement of the magazine.

3. The method of claim 1, additionally comprising
   elevating the EOAT to contact only an upper portion of the product loaded to the magazine; and
   tilting product delivered to the magazine to an angle to match product already in the magazine.

4. The method of claim 1, additionally comprising moving, using the EOAT, a case originally containing the product loaded to the magazine to a waste receiving area.

5. The method of claim 1, additionally comprising switching the paddle follower from a first mode, wherein the paddle follower is advanced until contact is made by a sensor on the paddle follower, to a second mode, wherein the paddle follower advances synchronously with the second encoder tracking movement of the magazine, wherein the mode switch is made upon contact is made by the sensor.

6. The method of claim 1, wherein loading the additional product into the magazine with the EOAT comprises moving the EOAT directly behind existing product on the magazine within an area between the paddle follower after retraction and the product on the magazine.

7. The method of claim 1, additionally comprising synchronizing the paddle follower with the second encoder, in response to detection of the trailing product item by sensors on the paddle follower, to cause the paddle follower to move synchronously with the magazine.

8. A method of loading product into a magazine, comprising:
   advancing a paddle follower to apply pressure on a trailing product item in the magazine, to keep the trailing product item upright and leaning in a direction of product movement, the advancing directed to move the product into a consuming device;
   tracking movement of the paddle follower with a first encoder;
   tracking movement of the magazine with a second encoder;
   advancing the paddle follower synchronously with the second encoder as product is consumed;
   moving an EOAT (end of arm tool), carrying additional product to be loaded into the magazine, synchronously with the paddle follower according to the first encoder prior to retraction of the paddle follower;
   retracting the paddle follower from the trailing product item;
   moving the EOAT synchronously with the magazine according to the second encoder after retraction of the paddle follower;
   loading the additional product into the magazine with an EOAT; and
   advancing the paddle follower to contact a new trailing product item.

9. The method of claim 8, additionally comprising sensing the new trailing product item with at least one sensor carried by the paddle follower and in response switching the paddle follower to a mode of operation wherein the paddle follower moves in response to the second encoder tracking movement of the magazine.

10. The method of claim 8, additionally comprising
    elevating the EOAT to contact only an upper portion of the product loaded to the magazine; and
    tilting product delivered to the magazine to an angle to match product already in the magazine.

11. The method of claim 8, additionally comprising moving a case originally containing the product loaded to the magazine to a waste receiving area.

12. The method of claim 8, additionally comprising switching the paddle follower from a first mode, wherein the paddle follower is advanced until contact is made by a sensor on the paddle follower, to a second mode, wherein the paddle follower advances synchronously with the second encoder tracking movement of the magazine, wherein the mode switch is made upon contact is made by the sensor.

13. The method of claim 8, wherein loading the additional product into the magazine with an EOAT comprises moving the EOAT directly behind existing product on the magazine within an area between the paddle follower after retraction and the product on the magazine.

14. The method of claim 8, additionally comprising synchronizing the paddle follower with the second encoder, in response to detection of the trailing product item by sensors on the paddle follower, to cause the paddle follower to move synchronously with the magazine.

15. A method of loading product into a magazine, comprising:
    advancing product in the magazine into a consuming device;
    advancing a paddle follower to track a trailing product item in the magazine;
    applying sufficient pressure against the trailing product item, with the paddle follower, to keep the trailing product item upright and leaning in a direction of product movement;
    tracking movement of the paddle follower with a first encoder;
    tracking movement of the magazine with a second encoder;
    advancing the paddle follower synchronously with the second encoder as product is consumed;
    moving an EOAT (end of arm tool), carrying additional product to be loaded into the magazine, synchronously with the paddle follower according to the first encoder prior to retraction of the paddle follower;

retracting the paddle follower from the trailing product item;

moving the EOAT synchronously with the magazine according to the second encoder after retraction of the paddle follower;

loading the additional product into the magazine with the EOAT; and pushing on a new trailing product item by advancing the paddle follower to contact the new trailing product item, and by elevating the EOAT to contact only an upper portion of the product loaded to the magazine to thereby tilt product delivered to the magazine to an angle to match product already in the magazine.

16. The method of claim 15, additionally comprising sensing the new trailing product item with at least one sensor carried by the paddle follower and in response switching the paddle follower to a mode of operation wherein the paddle follower moves in response to the second encoder tracking movement of the magazine.

17. The method of claim 15, additionally comprising moving, using the EOAT, a case originally containing the product loaded to the magazine to a waste receiving area.

18. The method of claim 15, additionally comprising switching the paddle follower from a first mode, wherein the paddle follower is advanced until contact is made by a sensor on the paddle follower, to a second mode, wherein the paddle follower advances synchronously with the second encoder tracking movement of the magazine, wherein the mode switch is made upon contact is made by the sensor.

19. The method of claim 15, wherein loading the additional product into the magazine with the EOAT comprises moving the EOAT directly behind existing product on the magazine within an area between the paddle follower after retraction and the product on the magazine.

20. The method of claim 15, additionally comprising synchronizing the paddle follower with the second encoder, in response to detection of the trailing product item by sensors on the paddle follower, to cause the paddle follower to move synchronously with the magazine.

* * * * *